United States Patent
Sibitzky et al.

(10) Patent No.: US 12,207,604 B2
(45) Date of Patent: Jan. 28, 2025

(54) METHOD AND APPARATUS FOR AN ADAPTABLE VEHICLE LIGHT FIXTURE

(71) Applicant: Nacho LED LLC, Mesa, AZ (US)

(72) Inventors: Pete Sibitzky, Descanso, CA (US); Stephen Adams, Mesa, AZ (US); Brad LaMarche, Gilbert, AZ (US)

(73) Assignee: Nacho LED LLC, Mesa, AZ (US)

(*) Notice: Subject to any disclaimer, the term of this patent is extended or adjusted under 35 U.S.C. 154(b) by 0 days.

(21) Appl. No.: 18/596,478

(22) Filed: Mar. 5, 2024

(65) Prior Publication Data

US 2024/0206406 A1 Jun. 27, 2024

Related U.S. Application Data

(63) Continuation-in-part of application No. 18/389,012, filed on Nov. 13, 2023, which is a
(Continued)

(51) Int. Cl.
| | |
|---|---|
| *A01G 7/04* | (2006.01) |
| *A01G 9/20* | (2006.01) |
| *F21V 5/00* | (2018.01) |
| *G01J 1/32* | (2006.01) |
| *G01J 1/42* | (2006.01) |
| *H05B 45/20* | (2020.01) |
| *H05B 45/3725* | (2020.01) |
| *H05B 45/46* | (2020.01) |

(Continued)

(52) U.S. Cl.
CPC ............ *A01G 7/045* (2013.01); *A01G 9/20* (2013.01); *F21V 5/007* (2013.01); *G01J 1/32* (2013.01); *G01J 1/4204* (2013.01); *H05B 45/20* (2020.01); *H05B 45/3725* (2020.01); *H05B 45/46* (2020.01); *H05B 47/18* (2020.01); *H05B 47/185* (2020.01); *H05B 47/19* (2020.01); *F21V 19/0015* (2013.01); *F21Y 2113/13* (2016.08); *F21Y 2115/10* (2016.08); *H05B 45/14* (2020.01); *H05B 45/28* (2020.01); *H05B 45/50* (2020.01); *H05B 47/175* (2020.01); *Y02P 60/14* (2015.11)

(58) Field of Classification Search
CPC .......... A01G 7/045; A01G 9/20; F21V 5/007; F21V 19/0015
See application file for complete search history.

(56) References Cited

U.S. PATENT DOCUMENTS

| | | | |
|---|---|---|---|
| 7,950,821 B1 * | 5/2011 | Georgitsis | B60Q 1/0483 362/232 |
| 10,077,895 B1 * | 9/2018 | Deng | F21L 4/02 |

(Continued)

*Primary Examiner* — Christopher E Dunay
(74) *Attorney, Agent, or Firm* — Michael T Wallace

(57) ABSTRACT

A method and apparatus for an adaptable vehicle light mount is provided. A recess created within an interior of a heat sink fin array of the vehicle light allows associated mounting hardware to be embedded within the recess. A physical offset between the vehicle light and the associated vehicle may therefore be minimized to provide a shallower mounting profile. A tube may be incorporated into the recess so as to allow one or more vehicle lights to be mounted to a single mount point on a vehicle where the tube and associated mounting hardware are incorporated and function as part of the heat reducing components of the vehicle light.

20 Claims, 19 Drawing Sheets

Related U.S. Application Data continuation-in-part of application No. 18/094,568, filed on Jan. 9, 2023, which is a continuation-in-part of application No. 17/539,302, filed on Jan. 22, 2022, which is a continuation-in-part of application No. 17/219,346, filed on Mar. 31, 2021, now Pat. No. 11,357,173, which is a continuation-in-part of application No. 17/089,961, filed on Nov. 5, 2020, now Pat. No. 11,268,673, which is a continuation-in-part of application No. 16/907,217, filed on Jun. 20, 2020, now Pat. No. 11,129,248, which is a continuation-in-part of application No. 16/779,636, filed on Feb. 2, 2020, now Pat. No. 11,191,220, which is a continuation-in-part of application No. 16/515,778, filed on Jul. 18, 2019, now Pat. No. 10,548,264, which is a continuation of application No. 16/281,990, filed on Feb. 21, 2019, now Pat. No. 10,512,132, which is a continuation-in-part of application No. 16/194,111, filed on Nov. 16, 2018, now Pat. No. 10,398,090, which is a continuation-in-part of application No. 16/185,530, filed on Nov. 9, 2018, now Pat. No. 10,309,613, which is a continuation of application No. 15/822,074, filed on Nov. 24, 2017, now Pat. No. 10,034,342, which is a continuation of application No. 15/822,024, filed on Nov. 24, 2017, now Pat. No. 10,178,730, which is a continuation of application No. 15/821,941, filed on Nov. 24, 2017, now Pat. No. 10,028,350, which is a continuation-in-part of application No. 15/784,683, filed on Oct. 16, 2017, now Pat. No. 9,955,632, which is a continuation-in-part of application No. 15/714,337, filed on Sep. 25, 2017, now Pat. No. 9,943,040.

(60) Provisional application No. 63/042,969, filed on Jun. 23, 2020, provisional application No. 62/931,088, filed on Nov. 5, 2019, provisional application No. 62/489,965, filed on Apr. 25, 2017, provisional application No. 62/422,243, filed on Nov. 15, 2016, provisional application No. 62/399,447, filed on Sep. 25, 2016.

(51) Int. Cl.
  *H05B 47/18* (2020.01)
  *H05B 47/185* (2020.01)
  *H05B 47/19* (2020.01)
  *F21V 19/00* (2006.01)
  *F21Y 113/13* (2016.01)
  *F21Y 115/10* (2016.01)
  *H05B 45/14* (2020.01)
  *H05B 45/28* (2020.01)
  *H05B 45/50* (2022.01)
  *H05B 47/175* (2020.01)

(56) References Cited

U.S. PATENT DOCUMENTS

| | | | | |
|---|---|---|---|---|
| 2017/0184288 A1* | 6/2017 | Owens | ................... | H05B 47/19 |
| 2017/0299161 A1* | 10/2017 | Boorom | ................... | F21V 5/007 |
| 2020/0240621 A1* | 7/2020 | Lan | ........................... | F21K 9/23 |
| 2021/0207788 A1* | 7/2021 | Johnson | ................ | F21V 23/004 |
| 2021/0356111 A1* | 11/2021 | Zou | ........................ | F21V 21/30 |

* cited by examiner

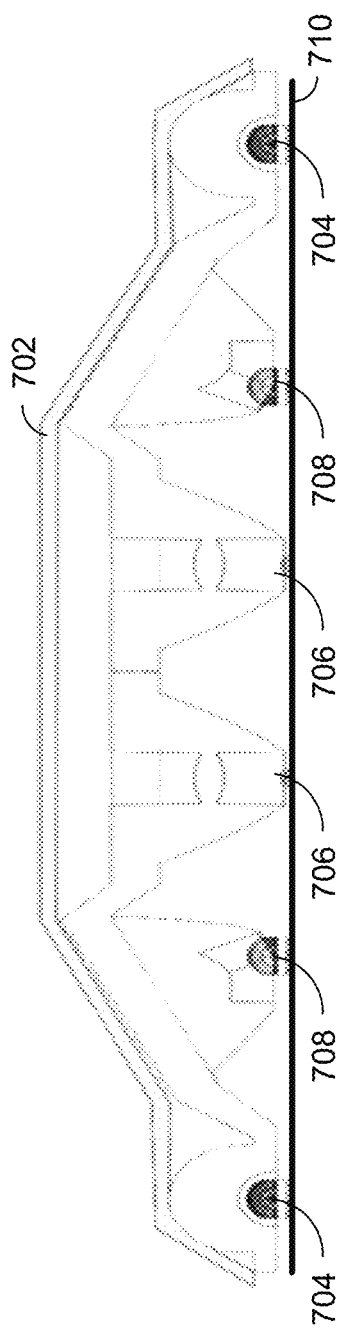

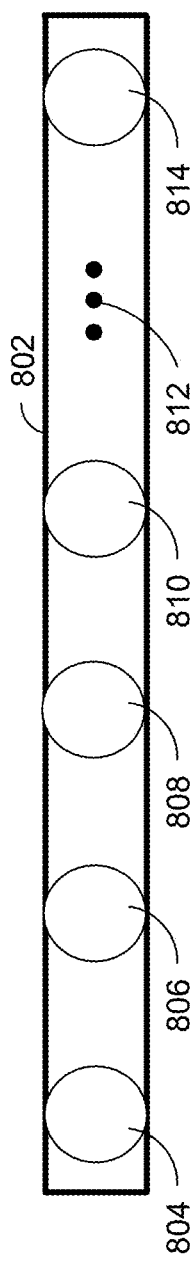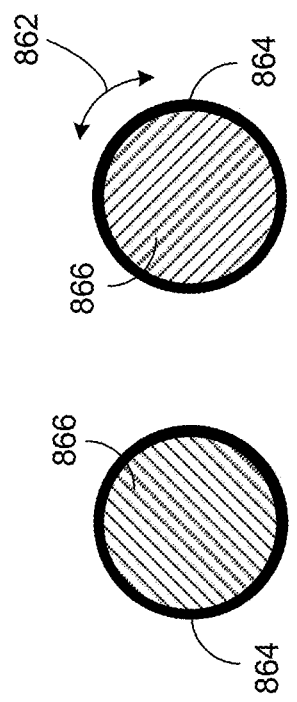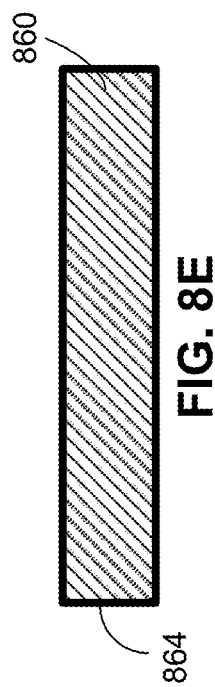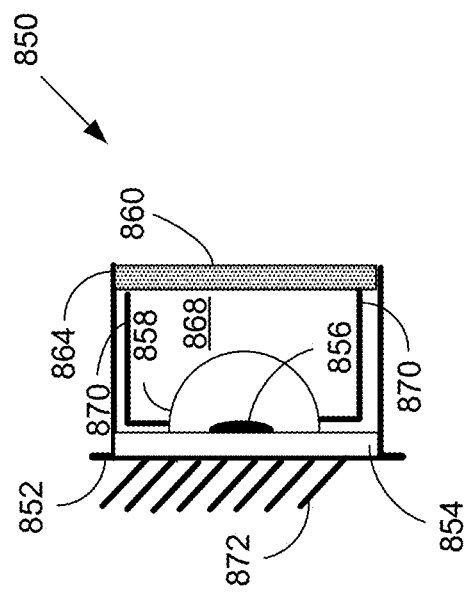

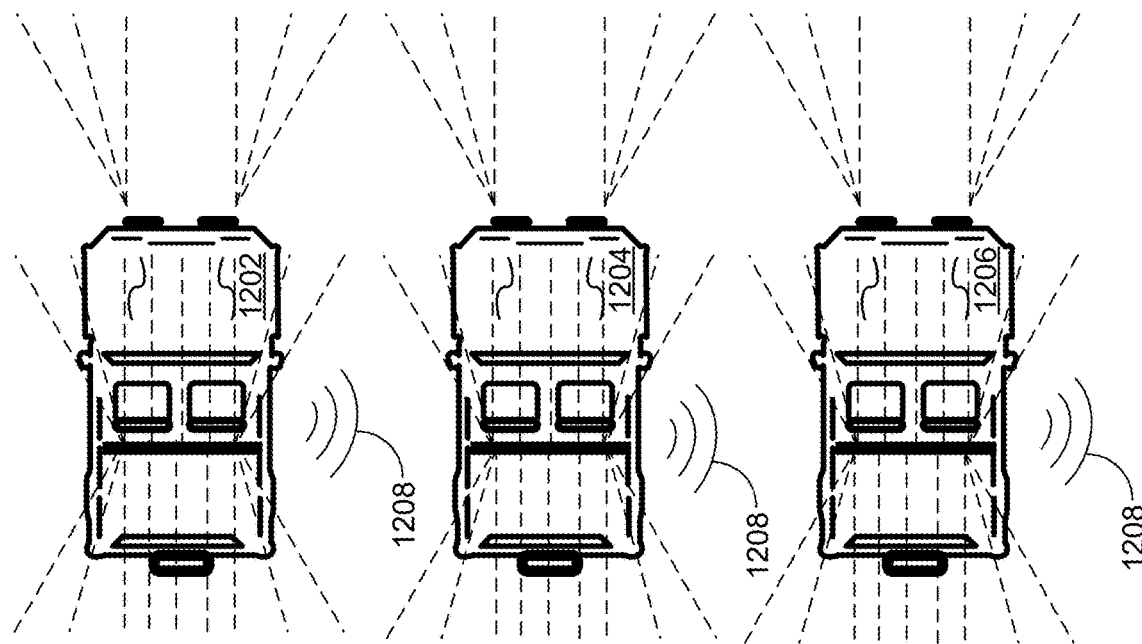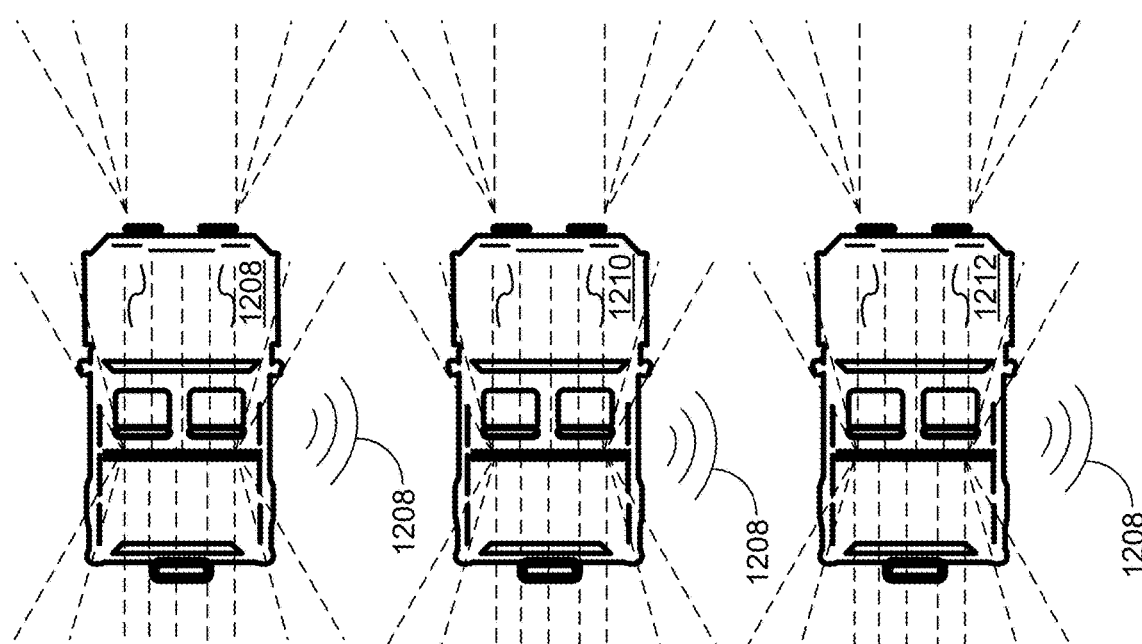
FIG. 12

METHOD AND APPARATUS FOR AN ADAPTABLE VEHICLE LIGHT FIXTURE

CROSS-REFERENCE TO RELATED APPLICATIONS

This application is a continuation in part of U.S. patent application Ser. No. 18/389,012 filed Nov. 13, 2023, which is a continuation-in-part of U.S. patent application Ser. No. 18/094,568 filed Jan. 9, 2023, which is a continuation-in-part of U.S. patent application Ser. No. 17/539,302 filed Jan. 22, 2022, which is a continuation-in-part of U.S. patent application Ser. No. 17/219,346 filed Mar. 31, 2021, now U.S. Pat. No. 11,357,173, which is a continuation-in-part of U.S. patent application Ser. No. 17/089,961 filed Nov. 5, 2020, now U.S. Pat. No. 11,268,673, which is a continuation-in-part of U.S. patent application Ser. No. 16/907,217 filed Jun. 20, 2020, now U.S. Pat. No. 11,129,248, which is a continuation-in-part of U.S. patent application Ser. No. 16/779,636 filed Feb. 2, 2020, now U.S. Pat. No. 11,191,220, which is a continuation-in-part of U.S. patent application Ser. No. 16/515,778 filed Jul. 18, 2019, now U.S. Pat. No. 10,548,264, which is a continuation of U.S. patent application Ser. No. 16/281,990 filed Feb. 21, 2019, now U.S. Pat. No. 10,512,132, which is a continuation-in-part of U.S. patent application Ser. No. 16/194,111 filed Nov. 16, 2018, now U.S. Pat. No. 10,398,090, which is a continuation-in-part of U.S. patent application Ser. No. 16/185,530 filed Nov. 9, 2018, now U.S. Pat. No. 10,309,613, which is a continuation of U.S. patent application Ser. No. 15/822,024 filed Nov. 24, 2017, now U.S. Pat. No. 10,178,730, which is a continuation of U.S. patent application Ser. No. 15/822,074 filed Nov. 24, 2017, now U.S. Pat. No. 10,034,342, which is a continuation of U.S. patent application Ser. No. 15/821,941 filed Nov. 24, 2017, now U.S. Pat. No. 10,028,350, which is a continuation-in-part of U.S. patent application Ser. No. 15/784,683 filed Oct. 16, 2017, now U.S. Pat. No. 9,955,632, which is a continuation-in-part of U.S. patent application Ser. No. 15/714,337 filed Sep. 25, 2017, now U.S. Pat. No. 9,943,040, which claims benefit of U.S. Provisional Patent Application No. 62/489,965 filed Apr. 25, 2017, and claims benefit of U.S. Provisional Patent Application No. 62/422,243 filed Nov. 15, 2016, and claims benefit of U.S. Provisional Patent Application No. 62/399,447 filed Sep. 25, 2016, each of which are incorporated herein by reference in their entireties.

U.S. patent application Ser. No. 17/089,961 filed Nov. 5, 2020 claims benefit of U.S. Provisional Patent Application No. 62/931,088 filed Nov. 5, 2019, and claims benefit of U.S. Provisional Patent Application No. 63/042,969 filed Jun. 23, 2020, each of which are incorporated herein by reference in their entireties.

FIELD OF THE INVENTION

The present invention generally relates to mounting systems, and more particularly to light mounting systems integrated within heat dissipation structure of the light.

BACKGROUND

Light emitting diodes (LEDs) have been utilized since about the 1960s. However, for the first few decades of use, the relatively low light output and narrow range of colored illumination limited the LED utilization role to specialized applications (e.g., indicator lamps). As light output improved, LED utilization within other lighting systems, such as within LED "EXIT" signs and LED traffic signals, began to increase. Over the last several years, the white light output capacity of LEDs has more than tripled, thereby allowing the LED to become the lighting solution of choice for a wide range of lighting solutions.

LEDs exhibit significantly optimized characteristics, such as source efficacy, optical control and extremely long operating life, which make them excellent choices for general lighting applications. LED efficiencies, for example, may provide light output magnitudes up to 200 lumens per watt of power dissipation. Energy savings may, therefore, be realized when utilizing LED-based lighting systems as compared to the energy usage of, for example, incandescent, halogen, compact fluorescent and high-intensity discharge (HID) lighting systems. As per an example, an LED-based lighting fixture may utilize a small percentage (e.g., 15-20%) of the power utilized by a halogen-based lighting system but may still produce an equivalent magnitude of light. As per another example, high power LEDs in excess of 30 watts is now possible in a single 5×5 mm LED package.

Conventional vehicular LED lighting applications typically provide either fixed beam patterns or manually adjustable beam patterns. In some applications, for example, a control console mounted within the interior cabin of a vehicle may allow the operator of that vehicle to control a beam width emitted by an LED-based lighting fixture based on manual inputs provided to the control console by the operator of the vehicle. Other applications provide adaptability of the light generated by the LED-based lighting fixture in response to dynamic characteristics of the vehicle, but do not allow for reconfiguration of the lighting system by the user once the lighting system is provisioned within the vehicle. Mounting of such conventional vehicular LED lights add height to the mounted light profile and do not provide any heat dissipation capabilities.

Efforts continue, therefore, to develop an LED-based vehicular lighting fixture that may integrate portions of the mounting hardware to provide a lower profile while increasing heat dissipation.

SUMMARY

To overcome limitations in the prior art, and to overcome other limitations that will become apparent upon reading and understanding the present specification, various embodiments of the present invention disclose methods and apparatus for mounting a light to a vehicle and utilizing the mount components as integrated heat sink components. In accordance with one embodiment of the invention, a vehicle light mounted to a vehicle comprises a heat sink array having a recess disposed along a first axis within an interior of the vehicle light, the recess has a first radius. The vehicle light further comprising a first clamp section disposed within the recess, the first clamp section having a second radius. The vehicle light further comprising a tube disposed within the first clamp section, the tube having a third radius. The vehicle light further comprising a second clamp section coupled to the first clamp section and the tube, the second clamp section having a fourth radius.

In accordance with another embodiment of the invention, a lighting system comprises a vehicle and one or more vehicle lights mounted to the vehicle. Each of the one or more vehicle lights includes a heat sink array having a recess disposed along a first length of a first axis of the vehicle light, the recess being disposed within an interior of the heat sink array. The one or more vehicle lights further includes a first clamp section disposed within the interior of the recess and a second clamp section coupled to the first clamp section.

In accordance with another embodiment of the invention, a method of mounting at least one light to a vehicle comprises disposing a recess within a heat sink fin array of the at least one light, the recess extending along a first axis perpendicular to an optical axis of the at least one light. The method further comprises disposing a mount component within an interior defined by the recess and mounting the at least one light to the vehicle via the mount component. The optical axis of the at least one light may be adjusted while the at least one light is mounted.

BRIEF DESCRIPTION OF THE DRAWINGS

Various aspects and advantages of the invention will become apparent upon review of the following detailed description and upon reference to the drawings in which:

FIG. 7 illustrates a cross-section of the LED-based vehicular light of FIG. 5;

FIG. 8A illustrate a light fixture in accordance with an embodiment of the present invention;

FIG. 8B illustrates a side-section view of a light element of the light fixture of FIG. 8A;

FIGS. 8C-8E illustrate lenses of the light fixture of FIG. 8A;

FIG. 12 illustrates a convoy of vehicles having lighting fixtures that are controlled as a network of lighting fixtures in accordance with an alternate embodiment of the present invention;

DETAILED DESCRIPTION

Figure 1:
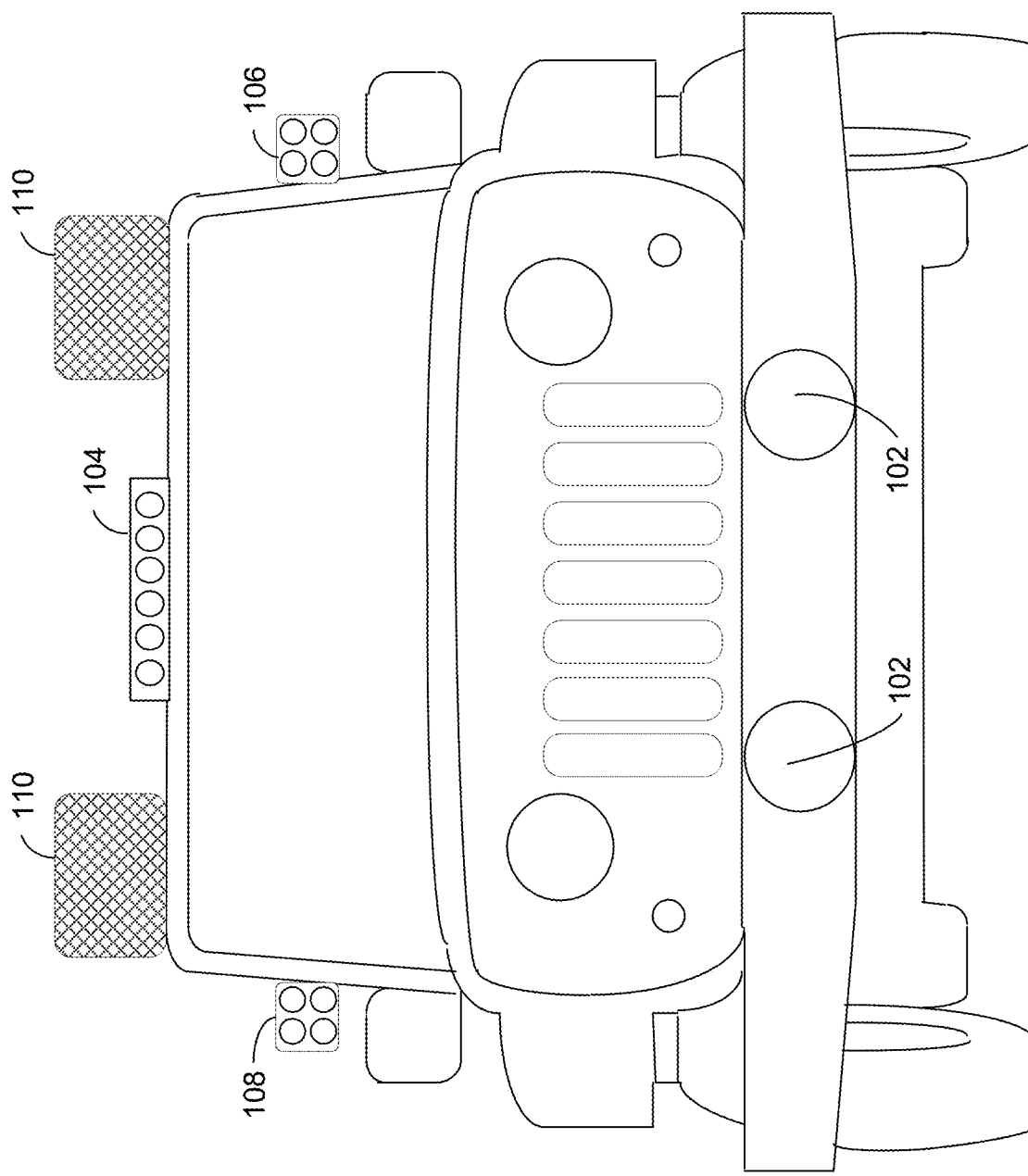
FIG. 1 illustrates an application of an LED-based, adaptable vehicular light in accordance with one embodiment of the present invention.

Generally, the various embodiments of the present invention are applied to a light emitting diode (LED) based lighting system that may contain one or more lighting arrays, where each lighting array may contain one or more LEDs and associated optics (e.g., one or more reflectors and/or lenses for one or more LEDs of the one or more arrays of LEDs). The LED arrays may be mechanically and electrically mounted to a printed circuit board (PCB) having control and bias circuitry that allows one or more specific sets of LED arrays to be illuminated on command (e.g., specific rows, specific columns, segments of rows and/or columns, and/or singular/multiple LEDs in the LED array). An associated optic may be mounted in proximity to one or more LEDs of each LED array in such a way that the optic may perform more than one function. For example, each optic may mechanically impose a uniform pressure onto the PCB against an associated heat sink to optimize heat transfer from the PCB to the heat sink. Further, each optic may contain mechanical standoffs to maintain an optimal separation distance between the one or more LEDs and the associated one or more lenses/reflectors so that light rays generated by the one or more LEDs may be optically varied by the associated one or more lenses/reflectors before projection onto a target.

Each optic of an associated LED array may exhibit the same or different optical characteristics as compared to each optic of a different LED array. For example, an LED-based lighting fixture may include multiple LED arrays where each optic of each LED array may exhibit a particular optical characteristic and each optic of another LED array may exhibit a different optical characteristic, such that light generated by one LED array may exhibit a light characteristic (e.g., a narrow beam width) that may be different than a light characteristic (e.g., a wide beam width) as generated by a different LED array. Alternately, the LED-based light fixture may contain multiple LED arrays that exhibit the same optical characteristic.

Each LED array of the LED-based light fixture may be categorized into two or more groups of lighting characteristics. For example, each optic of a group of LED arrays may cause light produced by each associated LED of the array to be formed into a cone of light that is symmetric about an optical axis of each LED within the LED array. Alternately, each optic of a different group of LED arrays may cause light produced by each associated LED of the array to be formed into a light distribution that is asymmetric about an optical axis of each LED within the LED array.

The LED-based light fixture may include LED arrays that may be categorized into between about 2 and 7 groups (e.g., 5 groups) of light characteristics. A first group of LED arrays may, for example, be categorized by a first light characteristic (e.g., a symmetric narrow beam width), a second group of LED arrays may be categorized by a second light characteristic (e.g., a symmetric medium beam width) and a third group of LED arrays may be categorized by a third light characteristic (e.g., a symmetric wide beam width). Fourth and fifth groups of LED arrays may, for example, be categorized by fourth and fifth sets of light characteristics (e.g., asymmetric beams weighted more heavily to one side of the optical axis or the other). It should be noted that asymmetric beams may be weighted more heavily at any angle with respect to the optical axis as compared to any other angle (e.g., an angle above the horizon relative to the optical axis may be more heavily weighted than an angle below the horizon relative to the optical axis).

The LED-based light fixture may include drive circuitry that may either be mounted on the same PCB upon which each LED of the LED-based light fixture is mounted, or conversely the drive circuitry may exist on a secondary PCB that may be mechanically and/or electrically connected to the first PCB. Accordingly, each of the one or more groups of LEDs may be illuminated by the drive circuitry in accordance with manual control inputs to the drive circuitry or automated and/or dynamic control inputs to the drive circuitry.

In one embodiment, the LED drive circuitry may include multiple sensors that may detect dynamic characteristics of a vehicle to which the LED-based light fixture may be mounted and in response, the light generated by the light fixture may be controlled based on the sensed characteristics. For example, a global positioning system (GPS) module may be included to allow manipulation of light generated by the light fixture based on the position and/or speed of the vehicle as determined by the GPS module. As per another example, a microelectromechanical system (MEMS) gyroscope may be included to allow manipulation of light generated by the light fixture based on the angular velocity of the vehicle. In other examples, a multi-axis accelerometer (e.g., a three-axis accelerometer) may be included to allow manipulation of light generated by the light fixture based on the three-dimensional attitude of the vehicle. Accordingly, for example, light generated by the LED-based light fixture may be manipulated by the drive circuitry to react to any one or more changes in the position, direction of travel, speed, acceleration and three-dimensional attitude of the vehicle to which the light fixture is mounted.

In other embodiments, light that may be incident on the vehicle from a particular direction relative to the vehicle may be sensed and in response, light generated by the light fixture may be manipulated accordingly. For example, multiple sensors (e.g., 3 sensors) may be utilized to sense incident illumination onto the light fixture that may be generated either by light generated by oncoming traffic or light generated from reflections of light, either of which may be manifested as glare to the occupant of the vehicle. Each sensor (e.g., photodiode or camera) may be positioned behind directional optics such that the illumination, or lux, measured by each sensor may be detected as light emanating from an object that is at a relative position with respect to the sensor.

In such an instance, for example, an increase in lux emanating from the left, center and/or right side of the vehicle may be detected by respective left, center and right sensors of the light fixture (or mounted separately from the light fixture at various locations on the vehicle), which may then cause the drive circuitry of the light fixture to react accordingly. An increase in lux detected from the driver's side of the vehicle may, for example, indicate oncoming traffic relative to the driver's side of the vehicle and in response, the drive circuitry may decrease the intensity of light generated by the light fixture on the driver's side of the vehicle so as to reduce glare imposed upon the driver of the oncoming vehicle. Alternately, for example, an increase in lux detected from the passenger's side of the vehicle may, for example, indicate reflections of light (e.g., reflections of light from a street sign) relative to the passenger's side of the vehicle and in response, the drive circuitry may decrease the intensity of light generated by the light fixture on the passenger's side of the vehicle so as to reduce glare that may be imposed upon the driver and/or passenger of the vehicle. In one embodiment, each sensor may have a specific orientation with respect to the vehicle such that the light fixture may report its specific orientation (and that of its associated sensor) in order to gain additional information that may be associated with the angle of incidence of the detected light.

The vehicular lighting system may include user-configurable lenses that may allow the user to configure any number of light elements into any one of a number of light distribution configurations, such as spot, flood, drive and SAE compliant fog and drive distributions to name only a few. Furthermore, the user may configure light fixture operation via a hand-held device such as a smartphone or magnet that may assign functionality based on manual, wire-based control inputs (e.g., via rocker switches or knob-based controls) or automated control inputs (e.g., via sensors). The configuration of the light system may include wireless provisioning of each light fixture into a specific location on a vehicle (e.g., roll bar, left A pillar or right A pillar) as well as a specific orientation (e.g., horizontally or vertically mounted). Each light fixture may be configured with a wired and/or wireless interface (e.g., thread-based mesh wireless interface or Bluetooth mesh wireless interface) to allow robust system operation.

The wired and/or wireless configuration of the lighting system may allow operation in any number of modes of operation, including manual, adaptive, off-road and on-road. Manual operation may be based on the wired and/or wireless configuration of the lighting system in combination with manual inputs to the system via wired controls. Adaptive operation may be based on the wired and/or wireless configuration of the lighting system in combination with sensor inputs (e.g., GPS and accelerometer sensor inputs) to the system. On-road operation may only utilize the SAE compliant lenses that may be pre-configured by the user, whereas off-road operation may utilize any lens configuration. In one embodiment, the vehicle's location may be sensed by a global positioning system (GPS) to determine whether the vehicle is on a public road or in an off-road location. As such, only those configurations meant for on-road use may be allowed if the vehicle is determined to be on a public road.

All user configurations may be wirelessly specified (e.g., via a smartphone or a proximity-based, magnetically sensitive system) and stored locally within each light fixture of the light system such that each light fixture may operate in accordance with its locally stored configuration. Each light fixture may communicate wirelessly (e.g., via thread-based mesh or Bluetooth mesh wireless communications) to all other light fixtures so as to build robust and error-free operation that may be based on the self-healing aspects of thread-based mesh wireless communications or the lightweight, flood-based approach of pushing messages to all nearby nodes via Bluetooth mesh. All user configurations may be defined on hand-held devices (e.g., smartphone or a proximity-based, magnetically sensitive device) by a user and then shared with other hand-held devices so that popular light configurations may be selected by one user and shared so they may be experienced by many users.

Multiple vehicles may be included within the same network (e.g., thread-based mesh or Bluetooth mesh network). As such, any light control command issued by any vehicle within the network may cause every other vehicle within that network to be responsive to the same light control command, irrespective of whether that light control command was issued manually or adaptively and whether that light control command was issued in an on-road or off-road environment. Accordingly, a convoy of vehicles (e.g., tactical military vehicles) may each exist within the same network (e.g., mesh network) and may each respond to a single master control (e.g., from the convoy commander).

A light fixture may include a mounting configuration that may be included within an interior of the vehicle light and integrated within its heat sink. Such a mounting configuration may include the ability to mount multiple vehicle lights side-by-side to a single mount position on the vehicle, whereby the mount configuration operates as a portion of the heat removal mechanism used to keep the vehicle light cool. Mounting components allow the vehicle light's beam direction to be adjusted while the vehicle light is mounted to the vehicle and allows for the lenses of each vehicle light to be interchanged as required for color output and/or beam-type selection.

Turning to FIG. 1, an application of the LED-based light fixture is exemplified, in which multiple (e.g., 2) LED-based light fixtures 102 may be mounted to the front end of vehicle 100, a single LED-based light fixture (e.g., light bar 104) may be mounted to the top (e.g., roll bar not shown) of vehicle 100 and a pair of LED-based light fixtures (e.g., light pods 106 and 108) may be mounted to the sides of vehicle 100 (e.g., on left and right A-pillars, respectively, of vehicle 100). As illustrated, LED-based light fixtures 102 may be geometrically arranged as an elliptical shape (e.g., circular with an 8" to 10" diameter), LED-based light fixture 104 may be geometrically arranged (e.g., as a rectangular-shaped light bar) and LED-based light fixtures 106-108 may be geometrically arranged (e.g., as a square-shaped light pod or PAR46 form factor). However, LED-based light fixtures 102, 104, 106 and/or 108 may also be arranged in any other geometrical shape as desired (e.g., oval, diamond, etc.).

As discussed in more detail below, any one or more light fixtures of FIG. 1 may include an internal audio amplifier that may accept an audio signal (e.g., wired via an audio jack or wirelessly via a Bluetooth feed from a smartphone or adjacent vehicle) and may provide an amplified audio signal (e.g., wired via an audio jack or wirelessly via a Bluetooth feed) to any one or more of speakers 110. The light fixtures of FIG. 1 may be ideally suited to house an audio amplifier since each light fixture may be environmentally sealed, may include heat sinks and may already supply the printed circuit board (PCB) required to route electrical signals to the audio amplifier's electronic circuits and to environmentally seal and cool the audio amplifier's electronic circuits.

Figure 2:
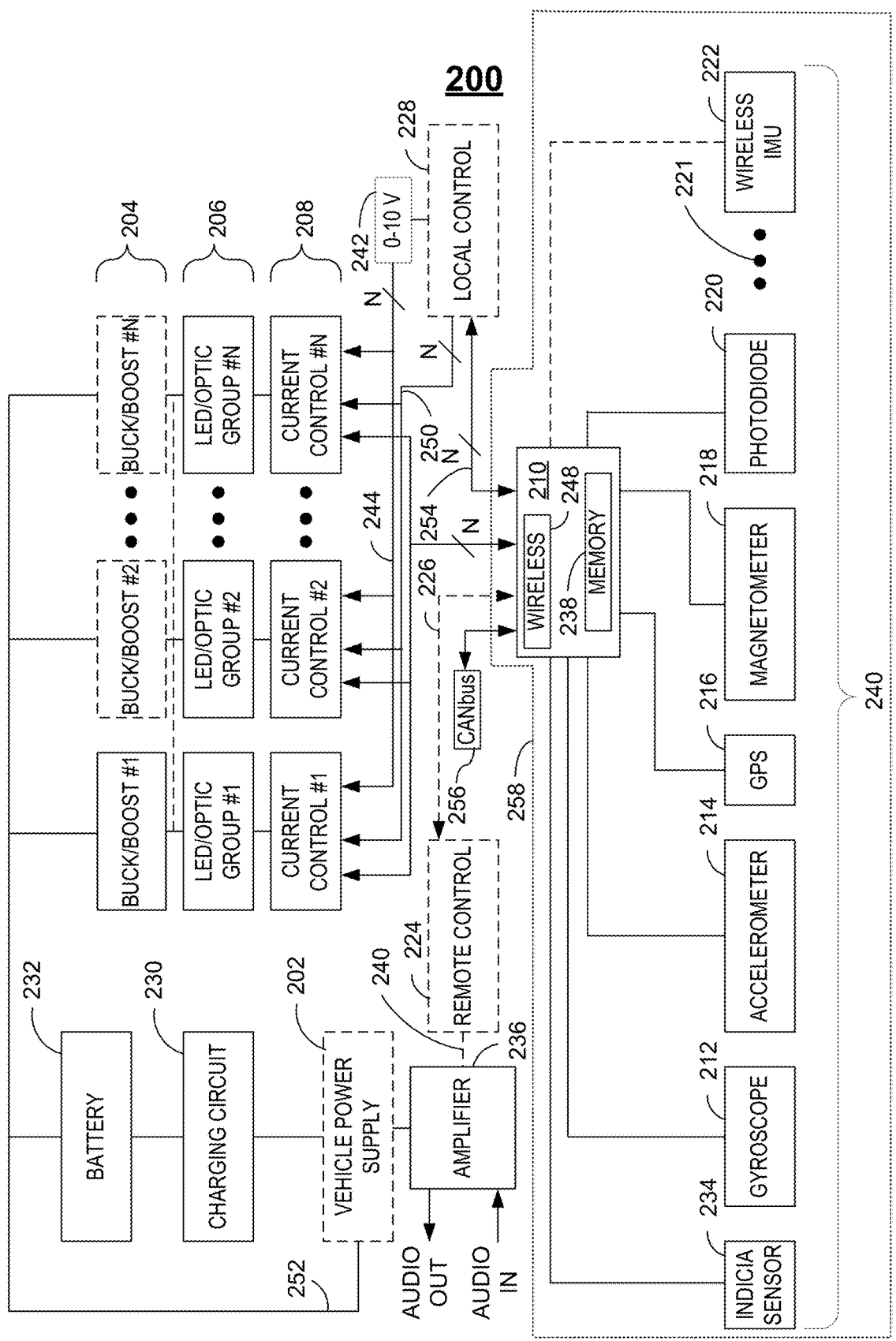
FIG. 2 illustrates a vehicular lighting system in accordance with one embodiment of the present invention.

Turning to FIG. 2, a block diagram of a vehicular lighting system 200 is exemplified, which may be included within one or more light fixtures and associated enclosures (e.g., light fixtures 102, 104, 106 and/or 108 of FIG. 1) each having multiple groups of one or more LEDs and associated optics 206, one or more DC-DC power converters (e.g., buck/boost power converters 204), current controllers 208, microprocessor 210, sensors 240, charging circuit 230, battery 232 and amplifier 236. It should be noted that while multiple DC-DC power converters 204 are exemplified, a single DC-DC power converter 204 may also be used to supply power to all LED groups 206 of a light fixture while current control modules 208 may be used to independently control the current magnitudes conducted by each LED group 206 and thereby independently control light intensities generated by each LED/optic group 206. In one embodiment, any one current control module 208 may be used to allow its associated LED group 206 to conduct any percentage (e.g., 0-100%) of the available current magnitude from the vehicle power supply.

Sensors that may be used to determine the vehicle's dynamic characteristics may include, for example, gyroscope 212, accelerometer 214, GPS 216, magnetometer 218 to name only a few among others such as an attitude and heading reference system (AHRS) each of which may also be collectively included within a handheld device such as a smart phone. Sensors that may be used to detect illumination from oncoming traffic and/or reflected illumination may include, for example, photodiode 220 or a camera. As discussed in more detail below, sensors 240 may include inertial measurement units (IMU) 222 that may be used to detect the three-dimensional orientation of each light fixture within vehicular lighting system 200 and indicia sensor 234 that may be used to determine a particular type of lens installed within each light element of each light fixture.

Vehicular lighting system 200 may further include optional charging circuit 230 and optional internal battery 232, which may allow vehicular lighting system 200 to be removed from the vehicle and used as a handheld flashlight. Vehicular lighting system 200 may be included within any LED-based light fixture associated with any vehicle light/handheld flashlight (e.g., LED-based light fixtures 102, 104, 106 and 108 of vehicle 100 of FIG. 1) or any two or more vehicle lights/handheld flashlights and associated light fixtures grouped together into a single wireless network (e.g., as discussed below in relation to thread-based or Bluetooth mesh network 1208 of FIG. 12). It should be noted that the lighting controls as discussed herein are effective whether lighting system 200 is being utilized in a group of one or more vehicle lights and/or one or more flashlights.

As discussed in more detail below, vehicle lighting system 200 may further include an amplifier (e.g., audio amplifier 236), which may be used to receive an audio signal either wirelessly (e.g., from a Bluetooth mesh connection established with remote control 224) or a wired connection (e.g., an audio jack located on the enclosure of the light fixture). As discussed in more detail below, the light fixture may include a waterproof enclosure as well as a heatsink. Accordingly, amplifier 236 may be incorporated on the interior of the light fixture's enclosure so that heat from amplifier 236 may be dissipated by the heatsink and so that the amplifier may be protected from environmental contaminants (e.g., water and dust).

In operation, vehicular lighting system 200 may either derive operational power from vehicle power supply 202 (e.g., a battery) that may be located within the engine compartment of a vehicle (e.g., vehicle 100 of FIG. 1) or as discussed in more detail below, operational power may be derived from internal battery 232, whose operational power levels may be maintained using charging circuit 230. Regulated power may, for example, be provided by DC-DC converters (e.g., one or more buck/boost converters 204), which may be included within the light fixture (e.g., light fixture 102 of FIG. 1), or as separate power modules so that regulated power may be supplied to one or more LED groups 206 at sufficient forward voltage magnitudes as may be required by each LED group. For example, if the forward voltage magnitude of any serially connected group of LEDs within LED groups 206 exceeds the voltage magnitude of vehicle power supply 202 (or optional internal battery 232), then a boost DC-DC converter may be used to produce a regulated voltage magnitude that is substantially equal to the forward voltage magnitude of that particular LED group. Conversely, for example, if the forward voltage magnitude of any serially connected group of LEDs within LED groups 206 is less than the voltage magnitude of vehicle power supply 202 (or optional internal battery 232), then a buck DC-DC converter may be used to produce a regulated voltage magnitude that is substantially equal to the forward voltage magnitude of that particular LED group.

Furthermore, one or more channels of drive circuitry (e.g., current control modules 208) may be included, such that an amount of current (e.g., substantially constant current or pulse width modulated current) conducted by any one or more groups of serially-connected LEDs may be independently regulated (e.g., via one or more pulse width modulation (PWM) control signals or direct current (DC) control signals as provided by current control modules 208) to control an intensity of light (e.g., 0-100% intensity) generated by each of the one or more groups of LEDs. It should be noted that one or more LEDs of the one or more groups of LEDs may be associated with an optic that may alter the light generated by the one or more LEDs of each LED group. Accordingly, for example, the intensity of light generated by each LED group as optically altered by optics associated with one or more LEDs of each LED group may be independently controlled by each respective current control module 208 to provide directional variability of light intensity as generated by light system 200.

Figure 3:
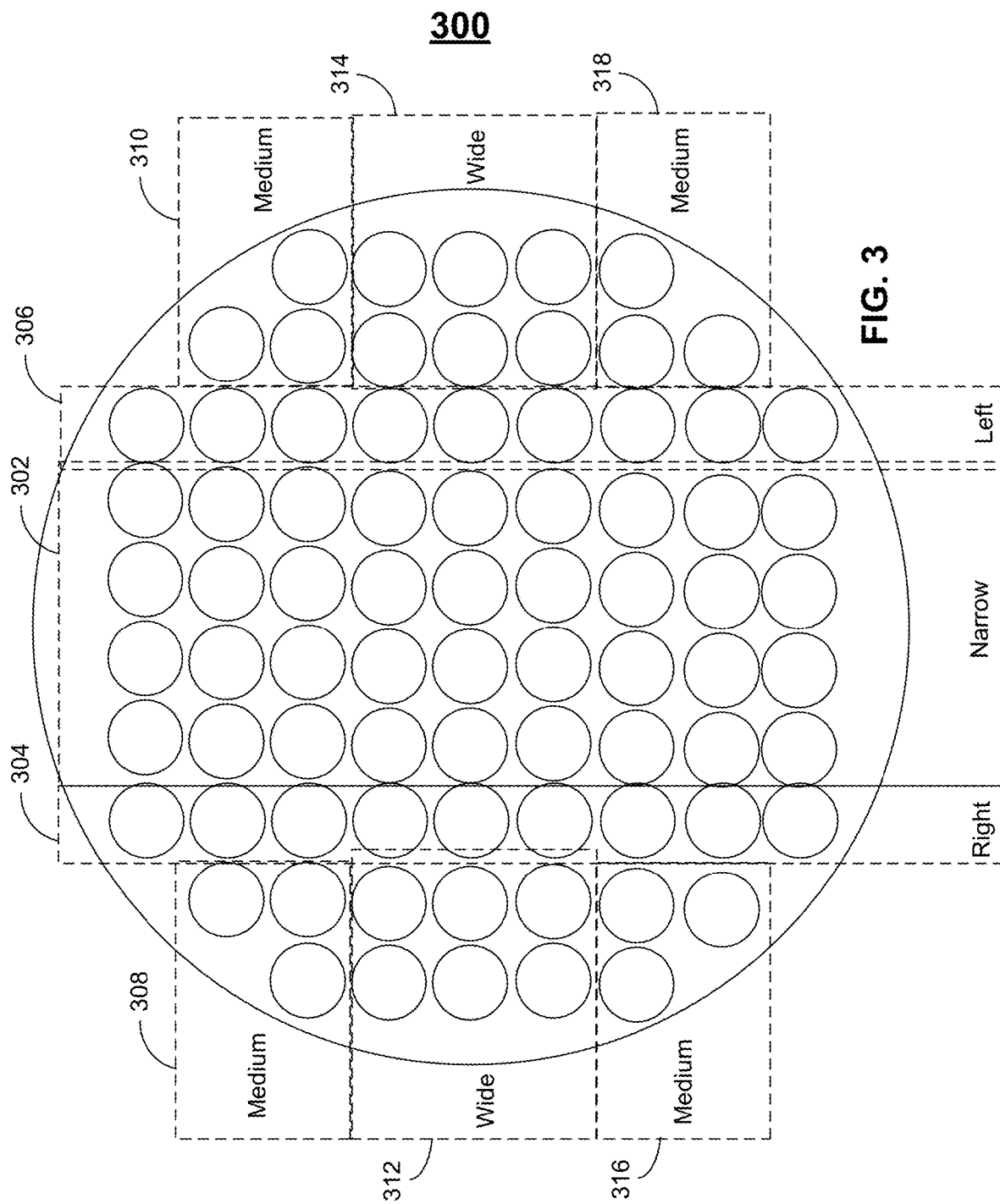
FIG. 3 illustrates an LED-based, adaptable vehicular light in accordance with one embodiment of the present invention.

Turning to FIG. 3, an LED-based light fixture 300 is exemplified, which may exhibit two or more LED groups (e.g., 9 LED groups 302-318) where any one LED group may exhibit the same or different beam pattern as any other LED group. Furthermore, through independent control of the magnitude of current conducted by each LED group or LED groups, the intensity (e.g., 0-100% intensity) of the beam pattern generated by each LED group may be controlled. Still further, by independently controlling the current conducted by each LED group in response to certain dynamic characteristics of the vehicle (e.g., vehicle 100 of FIG. 1) to which LED-based light fixture 300 (e.g., LED-based light fixtures 102 of FIG. 1) is mounted, adaptive control of the light generated by LED-based light fixture 300 may be achieved in response to certain dynamic characteristics (e.g., position, speed, acceleration, direction of travel, heading and attitude) of the vehicle.

LED-based light fixture 300 may, for example, include one or more groups of LED/optic combinations (e.g., LED/optic combination 302) that may produce a narrow beam pattern (e.g., a 10-degree full width at half maximum (FWHM) beam pattern) that may or may not be symmetric about the optical axis of LED/optic combination 302. Similarly, LED-based light fixture 300 may, for example, include one or more groups of LED/optic combinations (e.g., LED/optic combinations 308, 310, 316 and 318) that may produce a medium beam pattern (e.g., a 20-45 degree FWHM beam pattern) that may or may not be symmetric about the optical axis of LED/optic combinations 308, 310, 316 and 318. LED-based light fixture 300 may also, for example, include one or more groups of LED/optic combinations (e.g., LED/optic combinations 312 and 314) that may produce a wide beam pattern (e.g., a greater than 60-degree FWHM beam pattern) that may or may not be symmetric about the optical axis of LED/optic combinations 312 and 314. LED-based light fixture 300 may also include LED/optic combinations that do not produce symmetrical beam patterns, but rather may produce beam patterns that may be skewed about the optical axis (e.g., LED/optic combination 304 that may provide a beam pattern 10-20 degrees to the left of the optical axis of LED/optic combination 304 and greater than 10-20 degrees to the right of the optical axis of LED/optic combination 304) and the other side of the optical axis (LED/optic combination 306 that may provide a beam pattern 10-20 degrees to the right of the optical axis of LED/optic combination 306 and greater than 10-20 degrees to the left of the optical axis of LED/optic combination 306).

By controlling LED-based light fixture 300 as discussed above in relation to FIG. 2, it can be seen that each of the respective groups of LED/optic combinations of LED-based light fixture 300 may be adaptively and independently controlled in response to certain dynamic characteristics of the vehicle (e.g., vehicle 100 of FIG. 1) to which LED-based light fixture 300 may be attached. While an unlimited number of control algorithms potentially exist, Table 1 below describes one control algorithm that may be used to control the intensity of the multiple LED/optic combinations of LED-based light fixture 300 based on, for example, the speed and direction of travel of the vehicle to which LED-based light fixture 300 may be mounted.

A design constraint may require that a maximum current magnitude (e.g., 10 amps) may be drawn from the vehicle's power supply (e.g., vehicle power supply 202 of FIG. 2). Accordingly, each group of the groups of LEDs of LED-based light fixture 300 may share a percentage of the maximum current magnitude as may be dictated by the respective drive circuitry for each LED group (e.g., current control modules 208 of FIG. 2).

TABLE 1

| Speed (MPH) | Direction | Narrow (%) | Medium (%) | Left (%) | Right (%) | Wide (%) | Total (%) |
| --- | --- | --- | --- | --- | --- | --- | --- |
| 0-10 | Straight | 5 | 20 | 10 | 10 | 55 | 100 |
| 0-10 | Left Turn | 5 | 10 | 40 | 0 | 45 | 100 |
| 0-10 | Right Turn | 5 | 10 | 0 | 40 | 45 | 100 |
| 10-20 | Straight | 15 | 40 | 10 | 10 | 25 | 100 |
| 10-20 | Left Turn | 10 | 30 | 40 | 10 | 10 | 100 |
| 10-20 | Right Turn | 10 | 30 | 10 | 40 | 10 | 100 |
| 20-30 | Straight | 25 | 40 | 10 | 10 | 15 | 100 |
| 20-30 | Left Turn | 25 | 10 | 50 | 10 | 5 | 100 |
| 20-30 | Right Turn | 25 | 10 | 10 | 50 | 5 | 100 |
| 30-40 | Straight | 35 | 40 | 10 | 10 | 5 | 100 |
| 30-40 | Left Turn | 25 | 20 | 45 | 10 | 0 | 100 |
| 30-40 | Right Turn | 25 | 20 | 10 | 45 | 0 | 100 |
| 40-50 | Straight | 45 | 35 | 10 | 10 | 0 | 100 |
| 40-50 | Left Turn | 35 | 20 | 40 | 5 | 0 | 100 |
| 40-50 | Right Turn | 35 | 20 | 5 | 40 | 0 | 100 |
| 50-60 | Straight | 65 | 15 | 10 | 10 | 0 | 100 |
| 60+ | Straight | 75 | 5 | 10 | 10 | 0 | 100 |

As an example, LED-based light fixture 300 may include LED/optic group 302 that may produce a narrow beam width once illuminated, which upon the detected speed of the vehicle between 0 and 10 mph (e.g., as detected by GPS 216 and microprocessor 210 of FIG. 2), may conduct 5% of the available current (e.g., 5% of 10 amps equals 0.5 amps as directed by the associated current control module 208) as directed by the "Narrow" column of the first row of Table 1. In one embodiment, for example, the associated current control module may utilize a PWM signal to transition the LEDs associated with LED/optic group 302 (e.g., the "Narrow" beam width group) to be conductive during 5% of the period of the PWM signal to achieve a 5% intensity of LED/optic group 302 relative to the maximum intensity obtainable. Similarly, a PWM signal may transition the LEDs associated with LED/optic groups 308, 310, 316 and 318 (e.g., the "Medium" beam width group) to be conductive during 20% of the period of the PWM signal to achieve a 20% intensity of LED/optic groups 308, 310, 316 and 318 as directed by the "Medium" column of the first row of Table 1. The LEDs of LED/optic groups 306 (e.g., the "Left" beam width group), 304 (e.g., the "Right" beam width group) and 312/314 (e.g., the "Wide" beam width group) may similarly be commanded to 10%, 10% and 55% intensities, respectively, as directed by the "Left," "Right," and "Wide" columns of the first row of Table 1.

The vehicle may simultaneously be traversing a left turn or a right turn, which may similarly be detected by sensors (e.g., GPS 216/gyroscope 212 and microprocessor 210 of FIG. 2) and upon detection, may cause the second or third rows, respectively, of Table 1 to control the operation of LED-based light fixture 300 similarly as discussed above. For example, Table 1 may reside within a memory (e.g., memory 238 resident within microprocessor 210 of FIG. 2) whereby once the dynamic characteristics (e.g., speed and angular velocity) of the vehicle are sensed (e.g., by GPS sensor 216 and/or gyroscope 212) and reported to microprocessor 210, such dynamic characteristics may be utilized by microprocessor 210 to "look up" the corresponding intensities of the respective LED/optic groups of Table 1 and in response, command the corresponding intensities of LED/optic groups to those of Table 1 using the associated current control modules 208.

Figure 4A:
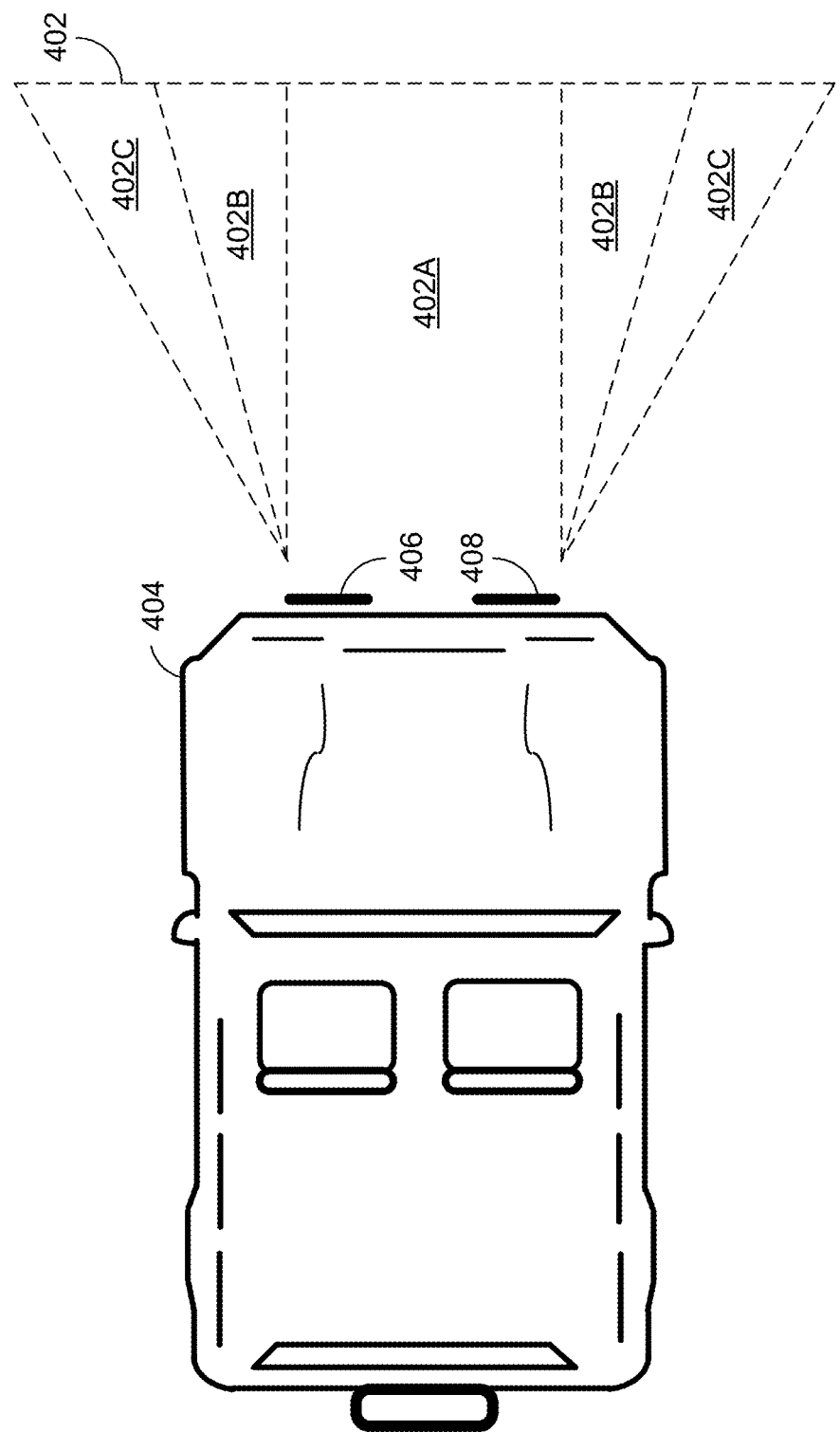
FIGS. 4A-4E illustrate beam patterns emitted by an LED-based, adaptable vehicular light in accordance with various embodiments of the present invention.

Turning to FIG. 4A, an exemplary beam pattern 402 (e.g., a composite of narrow, medium and wide beam patterns 402A, 402B and 402C, respectively) may result when vehicle 404 is traveling in a substantially straight direction as may be detected, for example, by sensors that are on-board vehicle 404 (e.g., sensors 212-218 and 222 of FIG. 2). In such an instance, the illumination of LED-based light fixtures 406 and 408 (e.g., LED-based light fixture 300 of FIG. 3) may be controlled by an on-board lighting control system (e.g., lighting control system 200 of FIG. 2) to adjust the intensity of each LED/optic group of LED-based light fixtures 406 and 408 as may be directed by an on-board look-up table (e.g., rows 1, 4, 7, 10, 13, 16 and 17 of Table 1) to illuminate portions that are substantially forward of vehicle 404 as observed by the driver of vehicle 414.

Figure 4B:
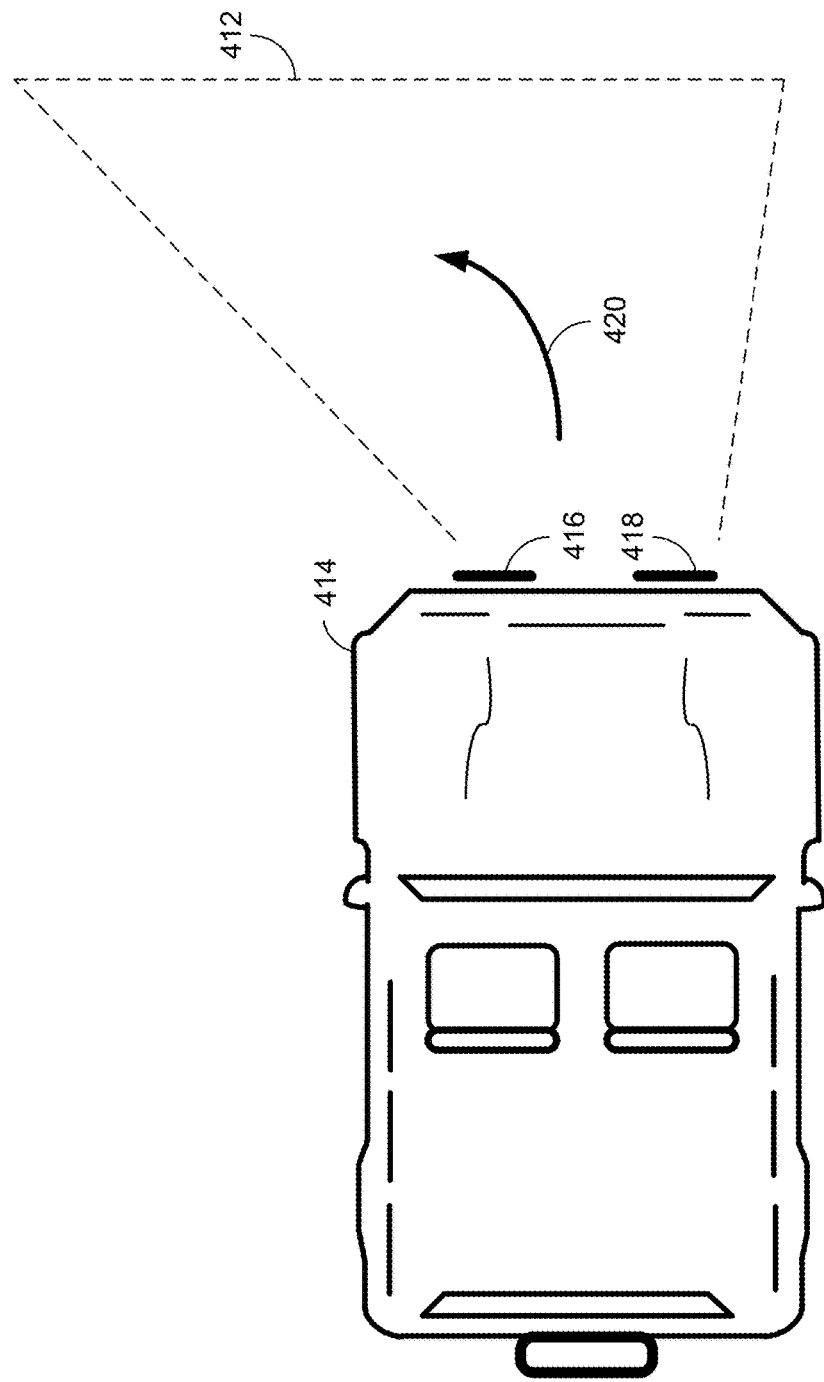

Turning to FIG. 4B, an exemplary beam pattern 412 may result when vehicle 414 is performing a substantially left turn (e.g., in direction 420) as may be detected, for example, by sensors that are on-board vehicle 414 (e.g., sensors 212-218 and 222 of FIG. 2). In such an instance, the illumination of LED-based light fixtures 416 and 418 (e.g., LED-based light fixture 300 of FIG. 3) may be controlled by an on-board lighting control system (e.g., lighting control system 200 of FIG. 2) to effect the intensity of each LED/optic group of LED-based light fixtures 416 and 418 as may be directed by an on-board look-up table (e.g., rows 2, 5, 8, 11 and 14 of Table 1) to illuminate portions that are substantially forward and to the left of vehicle 414 as observed by the driver of vehicle 414.

Figure 4C:
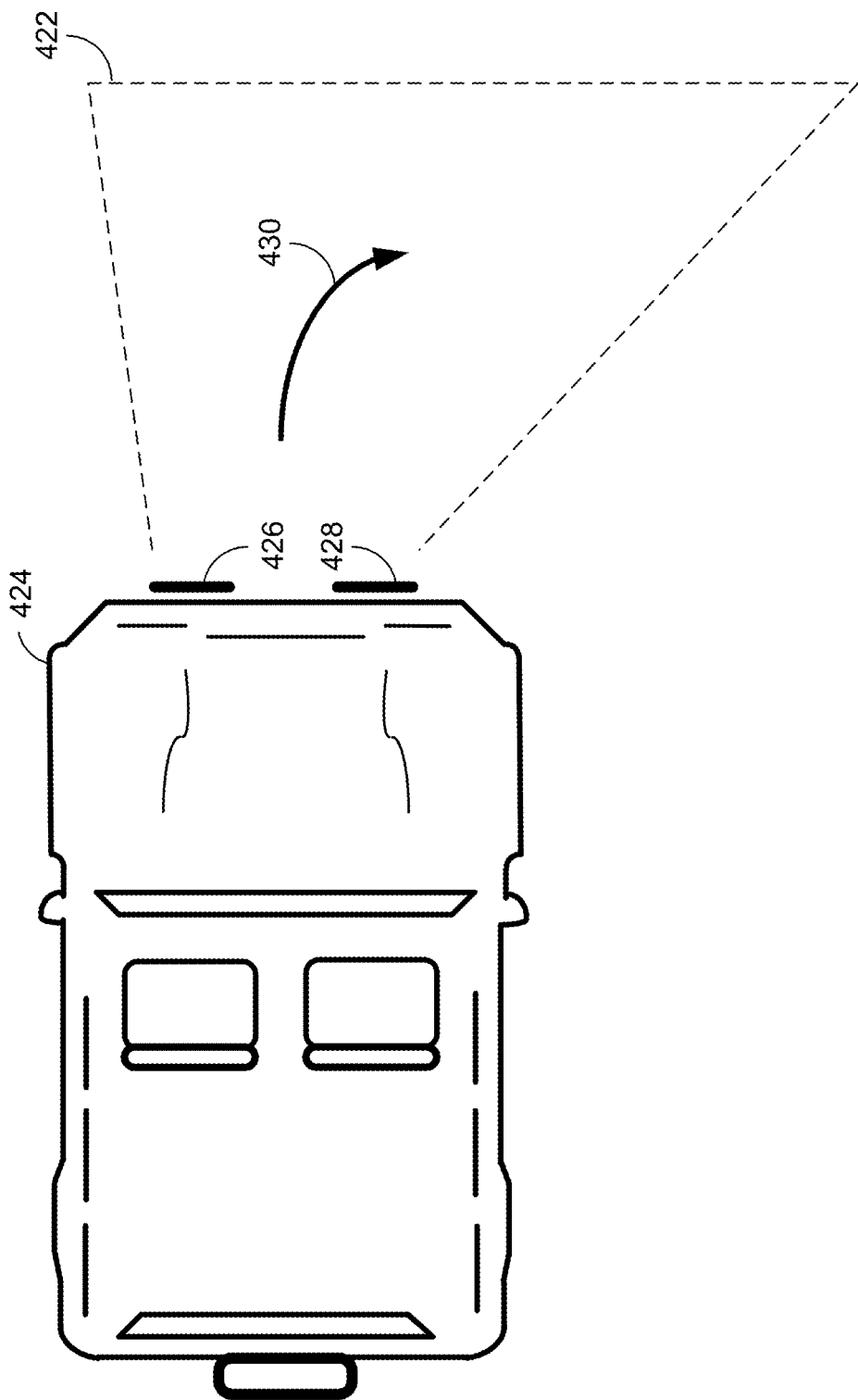

Turning to FIG. 4C, an exemplary beam pattern 422 may result when vehicle 424 is performing a substantially right turn (e.g., in direction 430) as may be detected, for example, by sensors that are on-board vehicle 424 (e.g., sensors 212-218 and 222 of FIG. 2). In such an instance, the illumination of LED-based light fixtures 426 and 428 (e.g., LED-based light fixture 300 of FIG. 3) may be controlled by an on-board lighting control system (e.g., lighting control system 200 of FIG. 2) to effect the intensity of each LED/optic group of LED-based light fixtures 426 and 428 as may be directed by an on-board look-up table (e.g., rows 3, 6, 9, 12 and 15 of Table 1) to illuminate portions that are substantially forward and to the right of vehicle 424 as observed by the driver of vehicle 424.

Figure 4D:
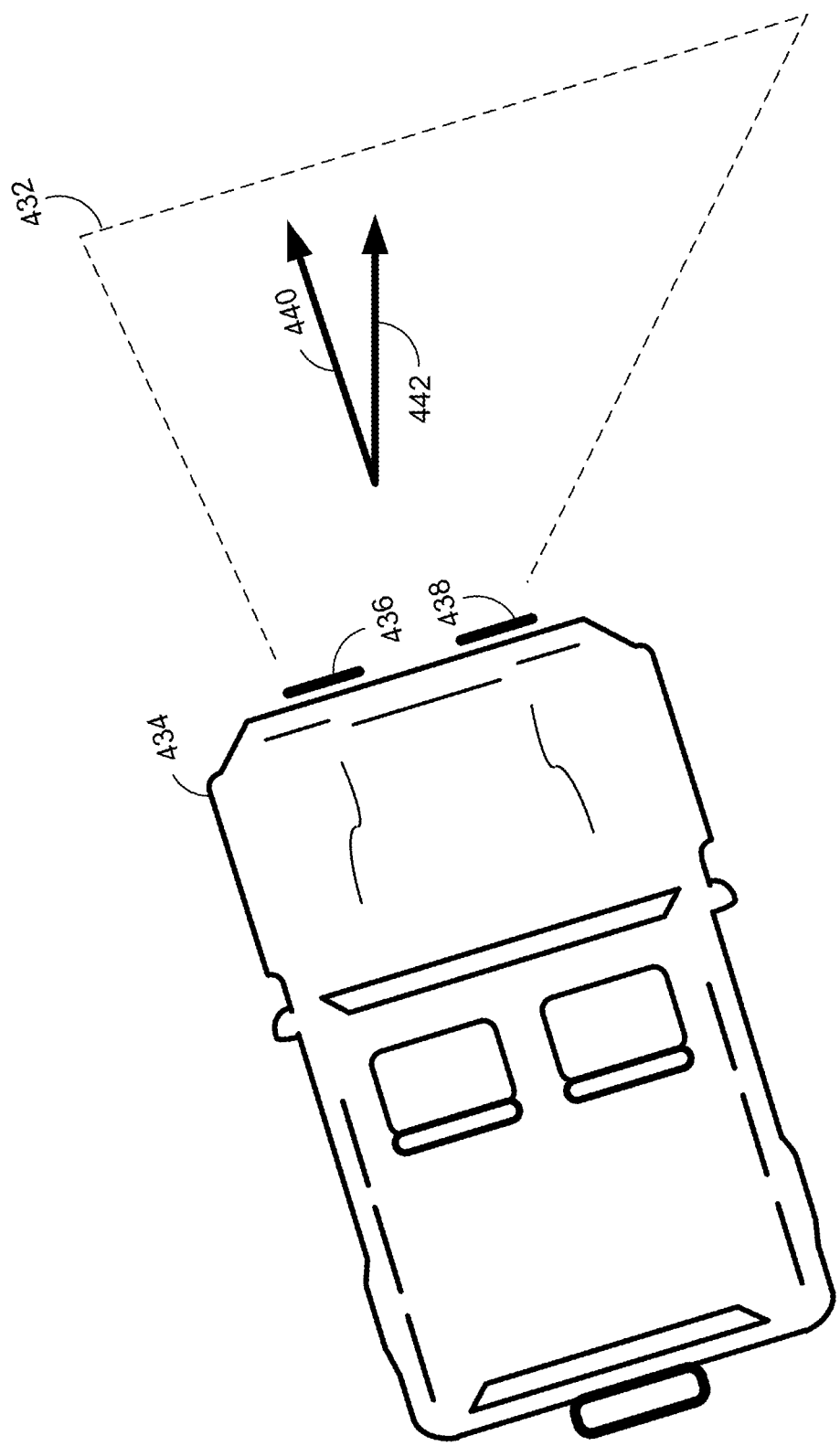

Turning to FIG. 4D, an exemplary beam pattern 432 may result when vehicle 434 is performing a power slide, whereby the rear end of vehicle 434 has lost traction and assumes a heading along vector 440, yet remains traveling in direction 442, as may be detected, for example, by sensors that are on-board vehicle 434 (e.g., sensors 212-218 and 222 of FIG. 2). In such an instance, a discrepancy may exist between heading vector 440 and the direction of travel 442, which may be resolved by an illumination of LED-based light fixtures 436 and 438 (e.g., LED-based light fixture 300 of FIG. 3) as controlled by an on-board lighting control system (e.g., lighting control system 200 of FIG. 2) to effect the intensity of each LED/optic group of LED-based light fixtures 436 and 438 to appropriately illuminate portions that are substantially aligned with vector 440, yet also illuminate portions that are substantially aligned with and to the right of vector 442 as observed by the driver of vehicle 434 during the power slide. Similar, but opposite, modifications to illumination of LED-based light fixtures 436 and 438 may occur when vehicle 434 experiences a power slide to the other side.

In other embodiments, vertical discrepancies between heading and direction of travel may also be detected and compensated. For example, the longitudinal axis of the vehicle may be aligned above or below the horizon, while the direction of travel of the vehicle remains substantially parallel to the horizon. In such an instance, the on-board lighting control system (e.g., lighting control system 200 of FIG. 2) may select the widest beam width available as the primary mode of illumination to illuminate portions forward of the vehicle that are both above and below the horizon.

Figure 4E:
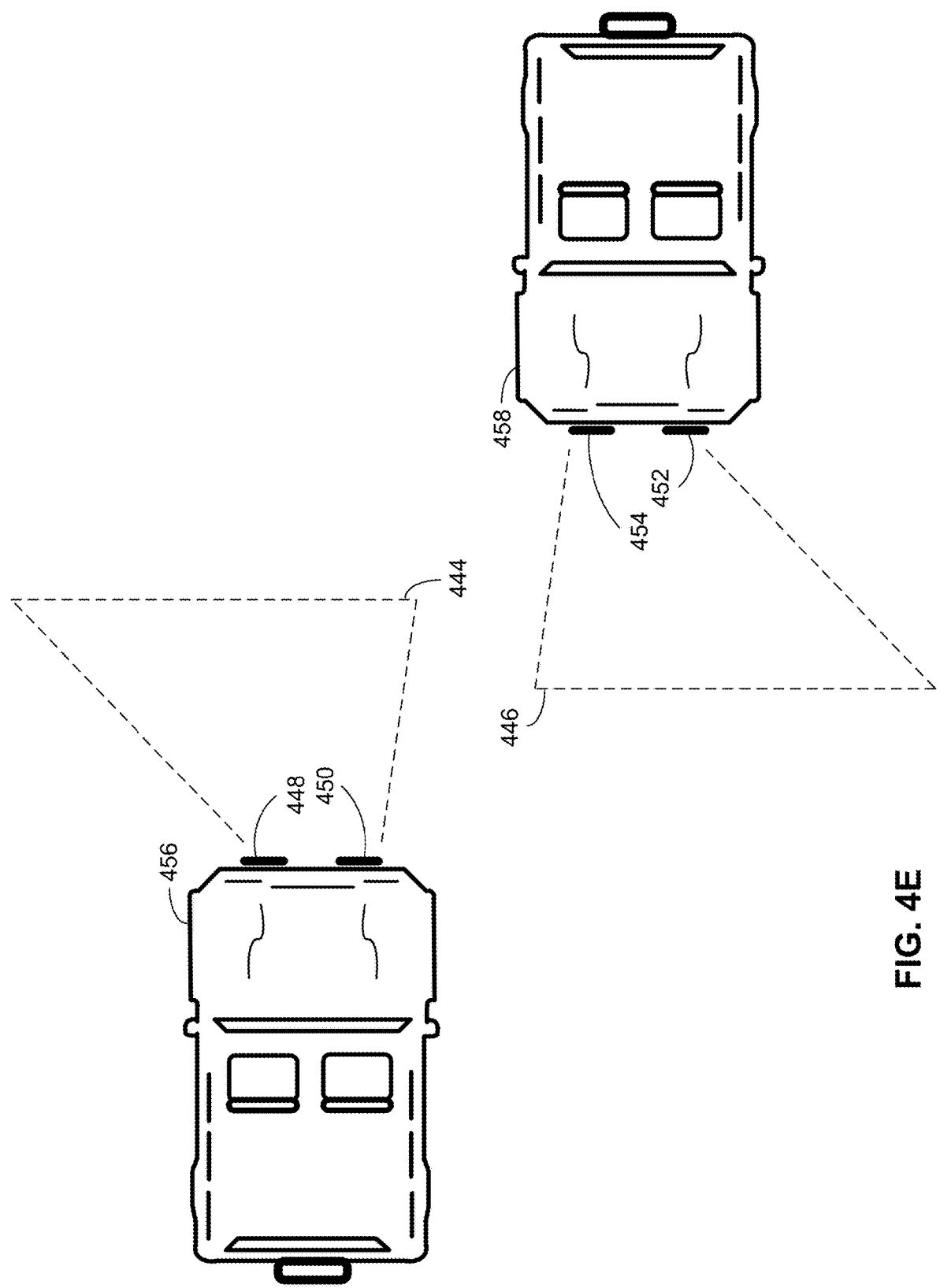

Turning to FIG. 4E, exemplary beam patterns 444 and 446 may result when vehicle 456 and 458, respectively, are approaching each other while traveling in opposite directions. Glare, as may be detected, for example, by sensors that are on-board vehicles 456 and 458 (e.g., photodiode 220 of FIG. 2) may be reduced by an appropriate illumination modification of LED-based light fixtures 448/450 and 452/454 (e.g., LED-based light fixture 300 of FIG. 3) as controlled by respective on-board lighting control systems (e.g., lighting control system 200 of FIG. 2) on each of vehicles 456 and 458 to effect the intensity of each LED/optic group of LED-based light fixtures 448/450 and 452/454 to appropriately illuminate portions forward of vehicles 456 and 458 that are specifically designed to reduce glare as perceived by the respective drivers of vehicles 456 and 458.

Turning back to FIG. 2, the control system associated with each LED-based light fixture mounted to a vehicle may be equipped with an inertial measurement unit (e.g., IMU 222) having wireless communication capability (e.g., thread-based or Bluetooth mesh network capability) such that the mounting orientation of each LED-based light fixture may be made known to all other light fixtures within the lighting system. For example, the three-dimensional mounting attitude of each LED-based light fixture may be detected by an internally mounted IMU (e.g., IMU 222 of FIG. 2) to identify and self-report its mounting orientation to a microprocessor of such a control system (e.g., microprocessor 210 of FIG. 2).

Accordingly, for example, the three-dimensional orientation of each LED-based lighting fixture may be known to microprocessor 210 such that the illumination of each light fixture may be commanded to maximize performance in relation to a characteristic of the vehicle (e.g., the vehicle's longitudinal axis or the current direction of travel of the vehicle). As an example, multiple light fixtures mounted to a vehicle may function as a system of light fixtures interconnected via a mesh network, whereby the three-dimensional attitude of each light is used to maximize the efficiency of the lighting system.

As an example, a forward mounted light fixture may be activated for use by microprocessor 210 when the vehicle is moving in a forward direction along its longitudinal axis, whereas a reverse mounted light fixture may instead be activated for use by microprocessor 210 when the vehicle is moving in a reverse direction along its longitudinal axis. As per another example, a light fixture mounted with its optical axis 5 degrees to the left of the vehicle's longitudinal axis may be activated for use during left turns while a light fixture mounted with its optical axis 5 degrees to the right of the vehicle's longitudinal axis may be activated for use during right turns.

The control system of FIG. 2 may, for example, enable a user of the lighting system to select lighting configurations via a wired interface (e.g., via local control 228) or via a wireless interface (e.g., remote control 226). Preselected lighting configurations may, for example, be communicated to microprocessor 210 via wireless interface 226 (e.g., a Bluetooth, WiFi, NFC, thread-based mesh, or magnetic interface) established between remote control 224 and wireless module 248 of processor 210, where such preselected lighting configurations as may be programmed by the user via an application running on the user's smartphone, tablet or computer (e.g., as discussed in more detail below in relation to FIGS. 9 and 10) or programmed by the user via remote control 224 (e.g., magnet) as discussed in more detail below. For example, a first preselect may enable the lighting system for 100% flood beam illumination. As per another example, a second preselect may enable the lighting system for 100% spot beam illumination. As per another example, a third preselect may enable the lighting system for configurable beam illumination depending upon each lens type that may be configured within the light fixture. A fourth preselect, for example, may enable adaptive operation, whereby as discussed above, any one or more beam widths may be automatically commanded in response to certain characteristics of the vehicle to which the lighting system is mounted.

In an alternate embodiment, any one of the preselected lighting configurations may, for example, be selected via local control mechanism 228 (e.g., one or more rocker switches and/or rotary switches within a cabin of the vehicle) so as to allow the user to transition between adaptive operation and any one of a number of static lighting preselects. As per one example, control bus 250 may be comprised of a number of control wires (e.g., 3 trigger wires for each of current controllers 208) and power bus 252 may be comprised of a number of power wires (e.g., an operational power and reference wire for each of buck/boost converters 204). It should be noted that the control wires may be sized to accommodate a relatively small amount of current (e.g., 5-10 mA) and used to activate a relay (not shown) within current controllers 208. As such, each relay may be controlled via a low-current trigger wire to cause the conduction of a large magnitude of current (e.g., a current magnitude required for 100% intensity in any given LED/optic group 206).

In operation, power bus 252 may be operative to connect/disconnect vehicle power supply 202 to respective buck/boost converters 204. Control bus 250 may be operative to activate/deactivate a first light beam (e.g., a light beam that may be generated by the top two LEDs of light fixture 106 of FIG. 1) via a signal from a first trigger wire and control bus 250 may be operative to activate/deactivate a second light beam (e.g., a light beam that may be generated by the bottom two LEDs of light fixture 106 of FIG. 1) via a signal from a second trigger wire. Each of the first and second trigger wires may, for example, be manually manipulated from within vehicle 100 via low-current switches that may be operable by a driver of vehicle 100 such that a control voltage (e.g., either a reference voltage or an operational power voltage) may be applied to the trigger wires and thereby construed as a binary logic signal that may exist on the trigger wire.

In a first embodiment, the intensity produced by the first and second light beams may depend upon which light beam is activated. If a single light beam is activated by manual operation via a signal provided by the first trigger wire (e.g., via a rocker and/or rotary switch contained within vehicle 100 of FIG. 1), then the corresponding light beam (e.g., the light beam produced by the top two LEDs or the bottom two LEDs of light fixture 106 of FIG. 1) may be illuminated at 100% intensity. If, on the other hand, both light beams are activated by manual operation via signals provided by the first and second trigger wires (e.g., via first and second rocker and/or rotary switches contained within vehicle 100 of FIG. 1), then the corresponding light beams (e.g., a first light beam produced by the top two LEDs of light fixture 106 and a second light beam produced by the bottom two LEDs of light fixture 106 of FIG. 1) may split the available power and illuminate at a shared (e.g., 50%) intensity each.

As discussed in more detail below in relation to FIGS. 9B, 9C and 9D and FIG. 1, for example, the left A pillar light (e.g., light fixture 106 of FIG. 1) may be configured (e.g., via remote control device 950 of FIG. 9D) to include upper lenses (e.g., lenses 918 and 920 of FIG. 9B) having "SPOT" characteristics and to include lower lenses (e.g., lenses 922 and 924 of FIG. 9B) having "FLOOD" characteristics. Similarly, the right A pillar light (e.g., light fixture 108 of FIG. 1) may be configured (e.g., via remote control device 950 of FIG. 9D) to include upper lenses (e.g., lenses 928 and 930 of FIG. 9C) having "SPOT" characteristics and to include lower lenses (e.g., lenses 932 and 934 of FIG. 9C) having "FLOOD" characteristics.

Further, left and right A pillar light fixtures 106 and 108, respectively, may be configured for manual (e.g., trigger wire) operation (e.g., via button 982 of FIG. 9D) such that a first trigger wire may activate the "SPOT" configured portions of light fixtures 106 and/or 108 while a second trigger wire may activate the "FLOOD" configured portions of light fixtures 106 and/or 108.

In operation, for example, the "SPOT" and "FLOOD" configured portions may individually, or in combination, consume 100% of the power available to each of light fixtures 106 and 108. Stated differently, if the "SPOT" configured portions of light fixtures 106 and 108 are activated while the "FLOOD" configured portions are deactivated, then the "SPOT" configured portions of each light fixture may consume 100% of the total power available to each light fixture. If, on the other hand, the "FLOOD" configured portions of light fixtures 106 and 108 are activated while the "SPOT" configured portions are deactivated, then the "FLOOD" configured portions of each light fixture may consume 100% of the total power available to each light fixture. However, if both the "SPOT" and "FLOOD" configured portions of light fixtures 106 and 108 are activated, then the "SPOT" and "FLOOD" configured portions of the light fixtures may share the available power (e.g., 50% power to each of the "SPOT" and "FLOOD" configured portions).

A third trigger wire may be included within control bus 250 that may allow a secondary effect (e.g., backlighting) to be activated/deactivated manually. In one embodiment, a light fixture (e.g., light fixture 106 of FIG. 1) may include a backlight/running light feature (e.g., as discussed below in relation to light pipe 870 of FIG. 8B). As such, for example, a daytime running light may, for example, be activated independently of any primary lighting that may be produced by the light fixture.

As per another example, the backlight/running light feature may be implemented as individually controllable LEDs that may be arranged in proximity to the primary lighting of the vehicle, whether mounted on the same PCB as the primary LEDs or on an auxiliary PCB. One or more of the individually controllable LEDs may further be configured to implement lighting features, such as a rotating light pattern, a flashing light pattern, a strobing light pattern, a multi-color strobing light pattern and a color cycling light pattern to name only a few. The backlight/running light features may be configured (e.g., as discussed in more detail below in relation to FIG. 10) and controlled as discussed herein (e.g., in relation to the controls discussed in relation to FIG. 2) with wired and/or wireless topologies.

In alternate embodiments, the third trigger wire may instead invoke a strobing function (e.g., as may be useful for aviation). In such an instance, the primary light beams may be activated in an alternating fashion (e.g., at a 1 Hz rate with 50% duty cycle) such that each light beam (e.g., two light beams) may be illuminated at 100% intensity independently of one another. Accordingly, each light beam may be strobed in synchronization with one another or asynchronously as required.

Alternately, the third trigger wire may be utilized in aviation applications whereby a "SPOT" or "FLOOD" configuration may be automatically selected depending upon the detected airspeed of the aircraft (e.g., "SPOT" selected for fast airspeeds and "FLOOD" selected for relatively slower airspeeds). A third trigger wire may also be utilized to change lighting configurations based on other control inputs to the aircraft. As per one example, autothrottles may be used on certain aircraft in conjunction with a Takeoff/Go Around (TOGA) button such that once the TOGA button is activated, the thrust produced may also be automatically increased via the autothrottle. As such, if thrust is automatically increased (and airspeed is thereby increased) based on the activation of the TOGA button, then one or more configured light fixtures may automatically toggle from "FLOOD" mode to "SPOT" mode as the airspeed increases above a threshold airspeed.

In yet other embodiments, the third trigger wire may be used by the user to manually activate alternate lighting features. As per one example, the third trigger wire may invoke a color tuning mode, whereby intensities of multiple channels (e.g., a red, green and blue channel) of LEDs may be modified (e.g., 0-100% for each channel) such that each activated channel of lighting may be blended to generate a particular color of light.

In yet other embodiments, as discussed in more detail below in reference to FIGS. 9A-9D and 10, each light fixture may be configured with multiple zones and one trigger wire may be allocated for each configured zone (e.g., as may be configured via trigger wire allocation control 974 of FIG. 9D). As such, commanded operation of each zone may be configured by allocating the appropriate zone settings for each trigger wire, whereby each light fixture may include one or more (e.g., 4) trigger wires whose functionality may be configured manually (e.g., magnetically) or via control 974 and the remaining configuration controls of FIGS. 9A-9D and 10.

Figure 10:
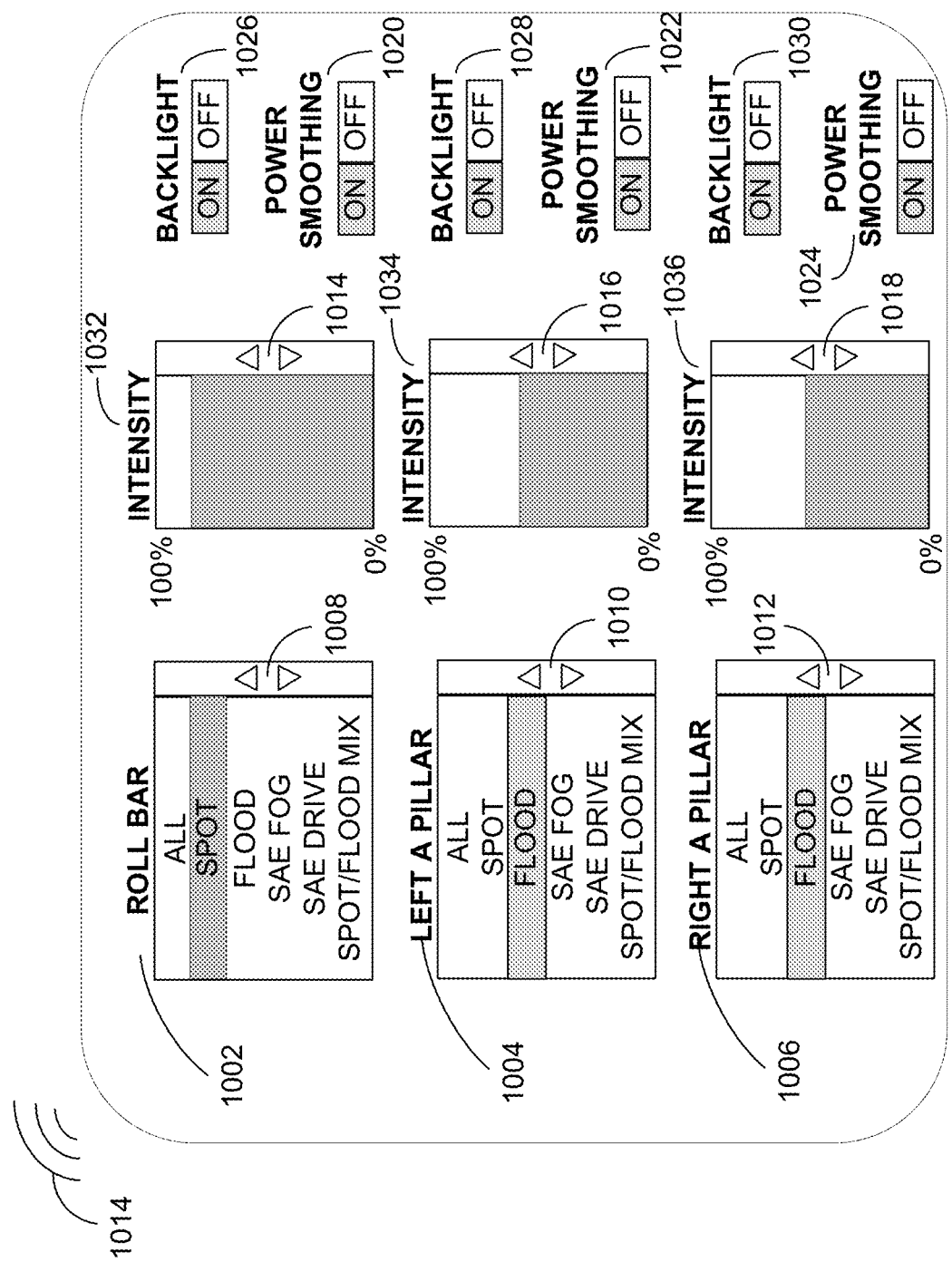
FIG. 10 illustrates a graphical user interface of a remote control device in accordance with an embodiment of the present invention.

As per one example, one or more optics of roll bar 956 may be configured with spot lenses 966 and each spot lens may be configured to operate at the intensity selected by intensity control 1032 of FIG. 10. In addition, trigger wire #1 may be associated with all spot lenses configured within roll bar 956 such that once trigger wire #1 is activated, all spot lenses configured within roll bar 956 may activate at the intensity level selected by intensity control 1032. Additionally, one or more optics of roll bar 956 may be configured with flood lenses and each flood lens may be configured to operate at the intensity selected by intensity control 1032 of FIG. 10. In addition, trigger wire #2 may be associated with all flood lenses configured within roll bar 956 such that once trigger wire #2 is activated, all flood lenses configured within roll bar 956 may activate at the intensity level selected by intensity control 1032. As can be seen, many different configurations may be allocated to each trigger wire such that activation of any one or more trigger wires may elicit light fixture operation as defined by their associated configurations.

Figure 5:
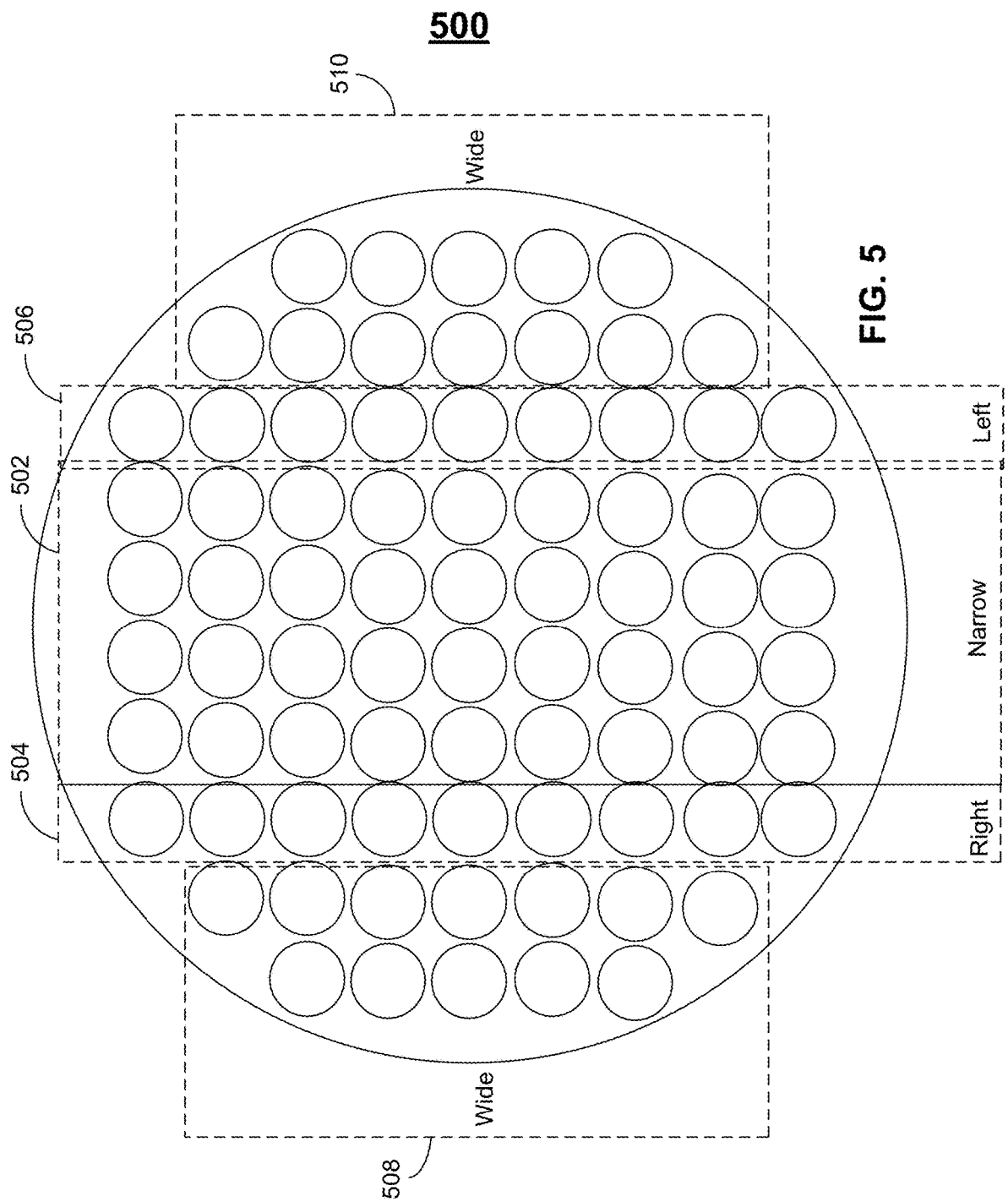
FIG. 5 illustrates an LED-based, adaptable vehicular light in accordance with an alternate embodiment of the present invention.

Turning to FIG. 5, an LED-based light fixture 500 is exemplified, which may exhibit two or more LED groups (e.g., 5 LED groups 502-510) where any one LED group may exhibit the same or different beam pattern as any other LED group. Furthermore, through independent control of the magnitude of current conducted by each LED group or LED groups, the intensity (e.g., 0-100%) of the beam pattern generated by each LED group may be controlled. Still further, by independently controlling the current conducted by each LED group in response to certain dynamic characteristics of the vehicle (e.g., vehicle 100 of FIG. 1) to which LED-based light fixture 500 (e.g., LED-based light fixtures 102 of FIG. 1) may be mounted, adaptive control of the light generated by LED-based light fixture 500 may be achieved in response to certain dynamic characteristics (e.g., position, speed, acceleration, direction of travel, heading and attitude) of the vehicle.

LED-based light fixture 500 may, for example, include one or more groups of LED/optic combinations (e.g., LED/optic combination 502) that may produce a narrow beam pattern (e.g., a 10-degree FWHM beam pattern) that may or may not be symmetric about the optical axis of LED/optic combination 502. Similarly, LED-based light fixture 500 may also, for example, include one or more groups of LED/optic combinations (e.g., LED/optic combinations 508 and 510) that may produce a wide beam pattern (e.g., a greater than 60-degree FWHM beam pattern) that may or may not be symmetric about the optical axis of LED/optic combinations 508 and 510. LED-based light fixture 500 may also include LED/optic combinations that do not produce symmetrical beam patterns, but rather may produce beam patterns that may be skewed about the optical axis (e.g., LED/optic combination 504 that may provide a beam pattern 10-20 degrees to the left of the optical axis of LED/optic combination 504 and greater than 10-20 degrees to the right of the optical axis of LED/optic combination 504) and the other side of the optical axis (LED/optic combination 506 that may provide a beam pattern 10-20 degrees to the right of the optical axis of LED/optic combination 506 and greater than 10-20 degrees to the left of the optical axis of LED/optic combination 506).

By controlling LED-based light fixture 500 as discussed above in relation to FIG. 2, it can be seen that each of the respective groups of LED/optic combinations of LED-based light fixture 500 may be adaptively and independently controlled in response to certain dynamic characteristics of the vehicle (e.g., vehicle 100 of FIG. 1) to which LED-based light fixture 500 may be attached. While an unlimited number of control algorithms potentially exist, control algorithms (e.g., as discussed above in relation to Table 1) may be used to control the intensity of the multiple LED/optic combinations of LED-based light fixture 500 based on, for example, the speed and direction of travel of the vehicle to which LED-based light fixture 500 may be mounted.

Figure 6D:
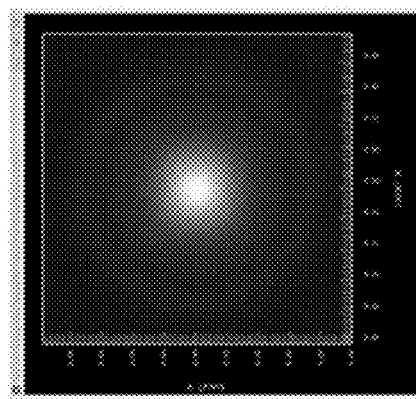
FIGS. 6A-6F illustrate various optic arrangements and associated shaded illuminance plots of the LED-based, adaptable vehicular light of FIG. 5.
Figure 6C:
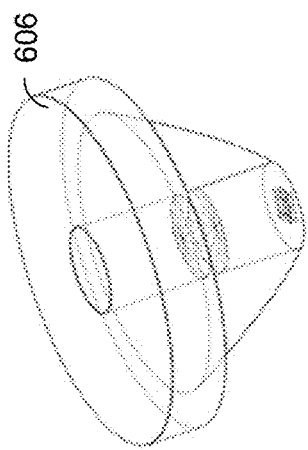
Figure 6B:
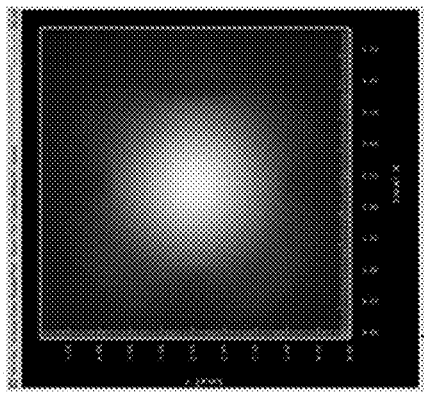
Figure 6A:
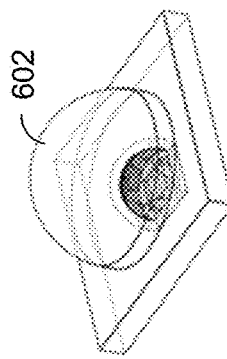
Figure 6F:
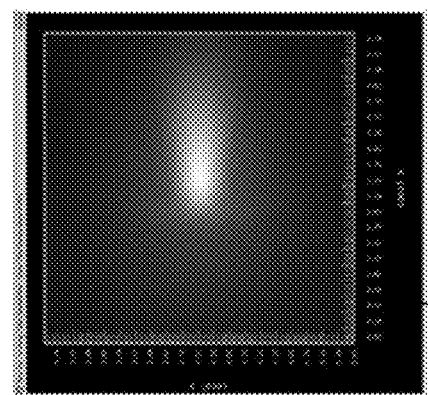
Figure 6E:
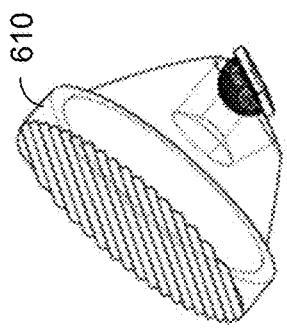

Turning to FIGS. 6A-6F, various optics and respective shaded illuminance plots are exemplified as may be associated with LED-based light fixture 500 of FIG. 5 (or the LED-based light fixtures of FIGS. 8 and 9). FIG. 6A, for example, exemplifies LED/optic combination 602 that may be used to generate a wide (flood) beam pattern as depicted by the shaded illuminance plot of FIG. 6B (e.g., as may be generated by LED/optic combinations 508 and 510 of FIG. 5). FIG. 6C, for example, exemplifies LED/optic combination 606 that may be used to generate a narrow (spot) beam pattern as depicted by the shaded illuminance plot 608 of FIG. 6D (e.g., as may be generated by LED/optic combination 502 of FIG. 5). FIG. 6E, for example, exemplifies LED/optic combination 610 that may be used to generate a directed beam pattern as depicted by the shaded illuminance plot 612 of FIG. 6F (e.g., as may be generated by LED/optic combinations 504 and 506 of FIG. 5).

Turning to FIG. 7, cross-section 700 of a portion of LED-based light fixture 500 is exemplified. As illustrated, each LED of each respective LED/optic combination 704, 706 and 708 may, for example, be mounted on the same plane of PCB 710. Alternately, separate PCBs may be configured within different planes of cross-section 700. In one embodiment, two columns of LED/optic combinations 706 may be included that may be used to generate a narrow (spot) beam pattern (e.g., as depicted by the shaded illuminance plot of FIG. 6D), two columns of LED/optic combinations 704 may be included that may be used to generate a wide (flood) beam pattern (e.g., as depicted by the shaded illuminance plot of FIG. 6B) and two columns of LED/optic combinations 708 may be included that may be used to generate a directed beam pattern (e.g., as depicted by the shaded illuminance plot of FIG. 6F). It should be noted, however, that virtually any number of columns/rows of LED/optic combinations may be configured for use depending upon the application, whether arranged in a circular, rectangular, oval or linear format. In addition, outer lens 702 may be more efficient if contoured with the underlying LED/optic combinations 704, 706 and 708 as shown.

Turning to FIG. 8A, a light fixture exhibiting an alternate shape (e.g., rectangular) having a sealed and waterproof housing 802 and any number (e.g., 6) light elements 804-814 is exemplified in which each individual light element may represent an LED/optic group (e.g., an LED/optic group 206 of FIG. 2) that may include one or more LEDs, a refractor (e.g., a total internal reflection (TIR) optic, a reflector or an optical lens) and a secondary lens. Any of light elements 804-814 may be exemplified by side-section view 850 of FIG. 8B, in which light element 850 may include a printed circuit board (e.g., PCB 854) having control circuitry (not shown) and one or more LEDs 856 to derive a selectable power signal from a power source (e.g., buck/boost converter 204 of FIG. 2) to conduct a selectable current signal (e.g., selectable via current control 208 of FIG. 2) to emit a light distribution having a selectable intensity (e.g., 0-100%) in proportion to an amount of current conducted by each light element 850. The light distribution may be modified (e.g., via refractor 858) into a narrow beam pattern (e.g., using any one or more of a TIR optic, a reflector or an optical lens).

In addition, secondary lens 860 may be allocated for each light element 850 (e.g., light elements 804-814), where each lens 860 may be removably connected to housing 852. In one embodiment, housing 852 may include heat sink 872 and bezel 864, which may further include a mechanical arrangement (e.g., a threaded, slotted or snap-fit receptacle) into which lens 860 may be removably threaded or otherwise removably connected to bezel 864. Accordingly, lens 860 and bezel 864 may combine to form a sealed, waterproof cavity 868 thereby protecting refractor 858 from harsh automotive conditions. It should be noted that refractor 858 may further form a seal around one or more LEDs 856 and PCB 854 thereby precluding access to one or more LEDs 856 within cavity 868 by a user of light fixture 802.

Lens 860 may either be formed as a clear lens with minimized (e.g., zero) optical characteristics or may be formed as a single/multiple-axis diffuser allowing the light distribution to be diffused along one or more optical axes to form any beam pattern (e.g., spot, flood or DOT compliant beam pattern). In one embodiment, for example, lens 860 may include a lenticular portion 866 that may diffuse light into a direction as defined by the orientation of lenticular portion 866 in relation to bezel 864 (e.g., as shown in FIG. 8C). Lens 860 may be rotated (e.g., rotated in 90 degree increments 862) within bezel 864 (e.g., as exemplified in FIG. 8D) so as to orient lenticular portion 866 in a different direction (e.g., a direction that is offset by 90 degrees) in relation to bezel 864 as compared to the lens orientation as depicted in FIG. 8C. It should be noted that detents (not shown) may exist within bezel 864 and corresponding mechanical engagements (not shown) within lens 860 such that lens 860 may be securely positioned within bezel 864 at a multitude of distinct orientations (e.g., four distinct orientations having 90-degree relative offsets) while also forming a seal to keep contaminants (e.g., water and dirt) from entering cavity 868 while lens 860 is attached to bezel 864.

In an alternate embodiment, as exemplified in FIG. 8E, lens 860 may be formed in the shape of the light fixture (e.g., rectangular) so that lens 860 may be associated with one or more light elements 804-814. As per an example, a length of lens 860 may be such that a shape of lens 860 may be square whereby lens 860 may be attached to bezel 864 to receive the light distribution from only one light element 850 and multiple of lenses 860 (e.g., square-shaped lens 860) may be attached onto bezel 864 where each lens 860 may be associated with a single light element 850. Conversely, a length of lens 860 may be such that lens 860 covers two or more light elements 850 (e.g., all light elements 804-814) such that lens 860 may receive the light distribution from more than one light element 850 (e.g., all light elements 804-814).

Accordingly, a user of the light fixture of FIG. 8A may configure one or more lenses 860 in one or more light elements 804-814 to define aspects of light distribution as needed. In one embodiment, for example, one or more lenses 860 may be selected to produce a light distribution that may exhibit compliance to a particular standard (e.g., the Society of Automotive Engineers (SAE) standard) thereby providing Department of Transportation (DOT) compliance for on-road use. In such an instance, a user of light fixture 802 may interchange one or more lenses 860 as needed for both off-road (e.g., spot or flood) and on-road (e.g., SAE Fog or SAE Drive) use.

Each lens 860 may, for example, include indicia (not shown) to indicate a particular standard to which lens 860 may conform. Such indicia may be detectable (e.g., via near-field communications (NFC), radio frequency identification (RFID) or optically) by a sensor (e.g., indicia sensor 234 of FIG. 2) that may be located within housing 852 and/or bezel 864 and communicated to a processor (e.g., microprocessor 210 of FIG. 2). In response, microprocessor 210 may command buck/boost 204 and/or current control 208 as may be necessary to constrain a feature of distributed light (e.g., intensity) from one or more light elements 804-814 so that the resulting light distribution from light fixture 802 may conform to the particular standard as may be indicated by any detected indicia that may be associated with each lens 860. In alternate embodiments, a particular standard (e.g., SAE) may require that the entire light fixture be compliant to that standard. In such an instance, for example, a processor (e.g., microprocessor 210 of FIG. 2) may disable the light fixture until all of the associated lenses indicate conformance to the requisite standard.

One or more light pipes 870 may further be utilized within light fixture 802 as exemplified in FIG. 8B. In one embodiment, for example, a separate LED (not shown) may be activated to produce light that may be redirected by light pipes 870 to, for example, provide light onto lens 860 for a daytime/nighttime running light application. In an alternate embodiment, light pipe 870 may redirect a portion of light generated by one or more LEDs 856 to augment/highlight lighting features that may be produced by one or more LEDs 856 in combination with optic 858. In yet another embodiment, one or more LEDs may be arranged in proximity to LED 856 to act in a manner consistent with a daytime/nighttime running light application.

As discussed above, any of light elements 804-814 may be individually configured for any desirable light distribution pattern (e.g., spot, flood, SAE Drive, SAE Fog, etc.) by configuring each of light elements 804-814 with corresponding one or more lenses 860 that may produce the desired light distribution pattern. As discussed above, a sensor (e.g., indicia sensor 234 of FIG. 2) may be used to automatically detect the type of lens 860 being utilized, or conversely, a user of light fixture 802 may manually enter the type of lens 860 being utilized into a configuration (as discussed in more detail below) that may be associated with light fixture 802.

Figure 9A:
FIGS. 9A-9D illustrate components of a light system in accordance with an embodiment of the present invention.
Figure 9B:
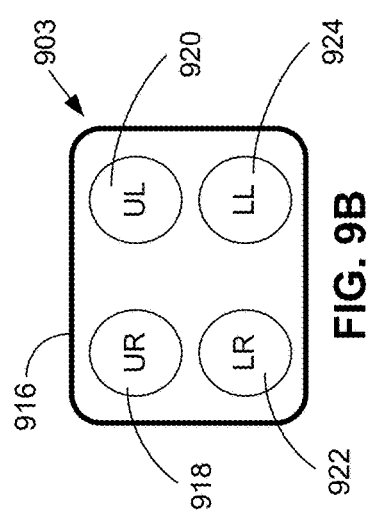
Figure 9C:
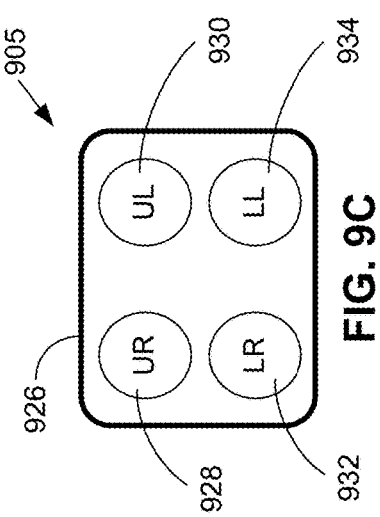
Figure 9D:
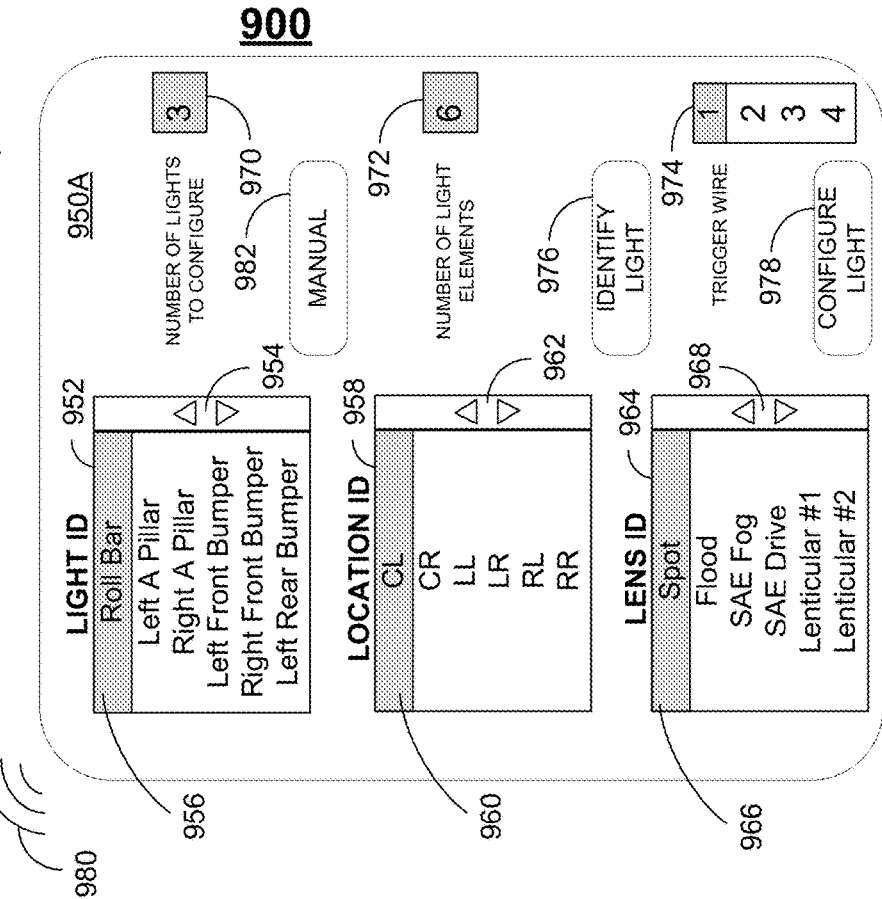

Lighting system 900 is exemplified that may include first automotive light fixture 901 of FIG. 9A (e.g., light bar 104 of FIG. 1), second automotive light fixture 903 of FIG. 9B (e.g., light pod 106 of FIG. 1), third automotive light fixture 905 of FIG. 9C (e.g., light pod 108 of FIG. 1) and remote control device 950 of FIG. 9D (e.g., remote control 224 of FIG. 2) that may include graphical user interface 950A that may be executing on a user's device (e.g., a smartphone, tablet, laptop, watch, etc.).

It should be noted that each of light fixtures 901, 903 and 905 may include one or more DC-DC power converters (e.g., buck/boost converters 204 of FIG. 2), one or more LEDs and associated optics (e.g., one or more LED/optic groups 206 of FIG. 2), one or more current controllers (e.g., current controllers 208 of FIG. 2), a processor (e.g., microprocessor 210 of FIG. 2) and a myriad of sensors (e.g., sensors 240 of FIG. 2).

Optionally, each of light fixtures 901, 903 and 905 may further include an internal battery and charging circuit (e.g., internal battery 232 and charging circuit 230 of FIG. 2) that may facilitate removal of the light fixture (e.g., light pod 106) from a vehicle (e.g., vehicle 100 of FIG. 1) to allow its use without requiring vehicle power (e.g., vehicle power supply 202 of FIG. 2).

In one embodiment, for example, light fixtures 903 and/or 905 (e.g., light pods 106 and/or 108 of FIG. 1) may be removed from the vehicle and utilized as a flashlight by the driver of the vehicle. In such an instance, the light fixture may be configured with a quick-release mount (not shown) that allows the light fixture to be removably connected to the vehicle. Power contacts (not shown) may also be provided within the mount, so that the light fixture may have access to vehicle power (e.g., vehicle power supply 202 of FIG. 2) via the mount for recharging. As discussed in more detail below, one or more lenses of the light fixture may be removable and selected according to the duty intended (e.g., spot lenses may be installed to facilitate extended distance illumination or flood lenses may be installed for scene lighting).

Light fixtures 901, 903 and/or 905 may further include an amplifier (e.g., audio amplifier 236 of FIG. 2). As discussed above, light fixtures 901, 903 and 905 may include sealed, waterproof enclosures 902, 916 and 926, respectively (e.g., enclosure 852 of FIG. 8B), that may include a heat sink (e.g., heat sink 872 of FIG. 8B). Accordingly, for example, the audio amplifier (e.g., audio amplifier 236 of FIG. 2) may be mounted to heat sink 872 to dissipate heat during operation and may also benefit from operation in a sealed and waterproof enclosure 852.

The amplifier (e.g., audio amplifier 236 of FIG. 2) may include a wired interface (e.g., an audio jack) that may accept an audio signal (e.g., signal "Audio In") or a wireless interface (e.g., interface 241 of FIG. 2 that may support Bluetooth, NFC, WiFi and/or thread-based wireless communications), whereby an audio signal may be provided to the amplifier using the user's device (e.g., a Bluetooth interface associated with the user's smartphone). Once amplified by the amplifier, the signal "Audio Out" may be provided to one or more speakers (e.g., speakers 110 of FIG. 1) either wirelessly (e.g., via any of a Bluetooth, NFC, WiFi and/or thread-based wireless communications medium) or via a wired connection (e.g., via an audio jack).

As exemplified in FIG. 9A, light fixture 901 (e.g., light bar 104 of FIG. 1) is shown that may include any number (e.g., 6) configurable lenses 904-914 that may mechanically engage housing 902 (e.g., as discussed above in relation to FIG. 8B) and whose relative position within housing 902 may be denoted using location designators (e.g., "RR", "RL", "CR", "CL", "LR", and "LL", for the relative location of lenses 904-914, respectively). As further discussed in relation to FIG. 8B, the one or more lenses may be associated with corresponding one or more DC-DC power converters (e.g., buck/boost converters 204 of FIG. 2), one or more LEDs and associated optics (e.g., one or more LED/optic groups 206 of FIG. 2) and one or more current controllers (e.g., current controllers 208 of FIG. 2). Accordingly, a light distribution having selectable attributes (e.g., intensity and beam pattern) may be projected from one or more lenses 904-914 as may be determined by a processor (e.g., microprocessor 210 of FIG. 2) and associated controls (e.g., remote control device 950).

Similarly, light fixtures 903 and 905 of FIGS. 9B and 9C, respectively (e.g., light pods 106 and 108 of FIG. 1, respectively) may include any number (e.g., 4) lenses 918-924 and 928-934, respectively, that may mechanically engage housings 916 and 926, respectively (e.g., as discussed above in relation to enclosure 852 of FIG. 8B), and whose relative position within their respective housings may be denoted using location designators (e.g., "UR", "UL", "LR", and "LL", for lenses 918-924 and 928-934, respectively). As further discussed in relation to FIG. 8B, the one or more lenses may be associated with corresponding one or more DC-DC power converters (e.g., buck/boost converters 204 of FIG. 2), one or more LEDs and associated optics (e.g., one or more LED/optic groups 206 of FIG. 2) and one or more current controllers (e.g., current controllers 208 of FIG. 2). Accordingly, a light distribution having selectable attributes (e.g., intensity and beam pattern) may be projected from one or more lenses 918-924 and 928-934 as may be determined by a processor (e.g., microprocessor 210 of FIG. 2) and associated controls (e.g., remote control device 950) or an alternate remote control device such as a handheld magnet as discussed in more detail below.

Turning to GUI 950A, an exemplary control console of remote control device 950 of FIG. 9D (e.g., remote control 224 of FIG. 2 implemented as a tablet, smartphone, laptop, watch, etc.) is shown, which may be utilized by a user to configure lighting system 900 as necessary. Text entry box 970 may, for example, allow the user to configure the number of light fixtures (e.g., 3) that may exist within lighting system 900. Alternately, remote control device 950 may instead attempt to pair (e.g., using a Bluetooth pairing function via interface 980) with as many lighting fixtures that may be in range and may then indicate the number of paired lighting fixtures in text box 970.

In one embodiment, the user may command lighting system 900 to identify each light fixture of the number of light fixtures indicated in text box 970 through actuation of button 976. As per one example, a single actuation (e.g., tactile depression) of button 976 of remote control device 950 (e.g., remote control 224 of FIG. 2) may cause an identification signal to be transmitted (e.g., via interface 980 using any one or more of an NFC, thread, WiFi or Bluetooth communication medium) to each light (e.g., as received by wireless module 248 of microprocessor 210 via interface 226 of FIG. 2) that may be paired with remote control device 950. In response, each processor (e.g., microprocessor 210 of FIG. 2) of each light fixture (e.g., lighting fixtures 901, 903 and 905) may receive its respective identification signal (e.g., via wireless interface 226) and may cause one or more of its LEDs (e.g., one or more LED/optic groups 206) to illuminate temporarily so that the user may locate the light fixture currently being identified. Once the light fixture that the user wishes to designate as the "Roll Bar" illuminates (e.g., as indicated by selection 956), the user may then actuate (e.g., by tactile depression) button 978. In response, remote control device 950 may transmit a configuration signal (e.g., a configuration signal sent via interface 980 via any one or more of an NFC, thread, WiFi or Bluetooth communication medium) thereby identifying the most recently illuminated light fixture as the "Roll Bar" light fixture. In response, remote control device 950 and the processor (e.g., microprocessor 210 of FIG. 2) of the "Roll Bar" light fixture may make note of the selection accordingly.

As per one example, a memory located within the processor of the identified light fixture (e.g., memory 238 of microprocessor 210 of FIG. 2) may be updated to include the current identification of the associated light fixture. In addition, remote control device 950 may store the identified light fixture information so that future communications with the light fixture may be correctly addressed (e.g., commands specific to the "Roll Bar" light fixture may be correctly addressed to the "Roll Bar" light fixture via interface 980).

The user may then once again depress button 976 so that the remaining unidentified light fixtures paired within lighting system 900 may be properly identified and associated with a particular physical location on the vehicle. As per one example, light fixture 903 of FIG. 9B (e.g., light fixture 106 of FIG. 1) may be identified and associated with the "Left A Pillar" location of the vehicle (e.g., vehicle 100 of FIG. 1). Similarly, light fixture 905 of FIG. 9C (e.g., light fixture 108 of FIG. 1) may be identified and associated with the "Right A Pillar" location of the vehicle (e.g., vehicle 100 of FIG. 1).

Once each light fixture of lighting system 900 has been provisioned to a specific vehicular location, each light fixture may report the number of light elements that may be included within the light fixture. As per one example, a memory (e.g., microprocessor memory 238 of FIG. 2) of each light fixture may include a variable that may be indicative of the number of light elements (e.g., light elements 804-814 of FIG. 8) that may be contained within the light fixture and may report the number of light elements to remote control device 950 (e.g., via wireless interface 980) as reported in box 972 of GUI 950A. Alternately, a user of control device 950 may simply enter the number of light elements contained within the light fixture into text box 972.

A user of control device 950 may then configure a lens type that may be associated with the one or more light elements of the light fixture. In one embodiment, a single lens may be configured for each light element of light fixture 901 (e.g., lenses 904-914 of FIG. 9A) and may include lens-type indicia that may be detectable (e.g., via indicia sensor 234 of FIG. 2) to determine the type of lens (e.g., spot, flood, SAE Fog, SAE Drive, etc.) that may be currently installed in the light fixture. In an alternate embodiment, a number of lenses less than the number of light elements (e.g., as discussed above in relation to FIG. 8E) may be configured having lens-type indicia that may be detectable (e.g., via indicia sensor 234 of FIG. 2) to determine the type of lens (e.g., spot, flood, SAE Fog, SAE Drive, etc.) that may be currently installed in the light fixture. Alternately, a user of control device 950 may simply enter the type of lens installed within the light fixture.

In addition, location indicia (e.g., "RR", "RL", "CR", "CL, "LR" and "LL", respectively) may be selected by the user such that GUI 950A may report each lens type and each lens type location for each lens (e.g., lenses 904-914). As per one example, menu selector 958 may indicate location ID 960 (e.g., location ID "CL" standing for "Center Left") is currently selected for the "Roll Bar" light fixture, which may identify lens 910 as a spot lens (e.g., as identified by lens ID 966 of menu selector 964). Accordingly, a spot lens (e.g., lens 860 of FIG. 8B) may be removably configured by the user as lens 910 within light fixture 901 so as to conform to the configuration as identified by GUI 950A. The remaining lenses of light fixtures 901, 903 and 905 may be similarly configured and updated within GUI 950A.

In operation, lighting system 900 may be configured to operate in one of several modes (e.g., a manual mode, an adaptive mode, an off-road mode or an on-road mode). Button 982, for example, may be actuated (e.g., via tactile depression) to toggle between multiple (e.g., five) modes of operation, whereby a textual indicator for button 980 may transition between "Manual," "Adaptive," "Group," "Off-Road" and "On-Road" for each depression of button 982 so that the user may discern the mode of operation within which lighting system 900 may be operating. In response, the mode of operation may be communicated (e.g., via interface 980 through any one or more of an NFC, thread, WiFi or Bluetooth communication medium) to each processor of each light fixture. Accordingly, each processor (e.g., microprocessor 210 of FIG. 2) may receive the mode of operation (e.g., via remote control 224, wireless interface 226 and wireless module 248) and may either control operation of its respective light fixture through use of sensor inputs (e.g., in an adaptive mode using sensors 212, 214, 216, 218, 220 and/or 222), control operation of its respective light fixture through use of local control 228 (e.g., rocker/rotary switches and/or knob-controlled potentiometers) or control operation of its respective light fixtures through a group mode as discussed in more detail below.

In a manual mode of operation, for example, a processor (e.g., microprocessor 210 of FIG. 2) may, or may not, be involved in lighting control. In a first embodiment, for example, a processor (e.g., microprocessor 210 of FIG. 2) of each light fixture may receive operational input control via manual control mechanisms (e.g., one or more rocker/rotary switches 228 and/or one or more knob-controlled potentiometers 228 via control bus 254 of FIG. 2), which may be located within the cab of a vehicle (e.g., vehicle 100 of FIG. 1). In such an instance, for example, the operation of each manual control mechanism may be configured via GUI 1000 of FIG. 10. Conversely, the operation of each manual control mechanism may be configured using a remote control device such as a handheld magnet as discussed in more detail below.

In an alternate embodiment, on the other hand, a processor (e.g., microprocessor 210 of FIG. 2) may either be absent, or non-operational. As such, one or more current controllers 208 may receive operational input control via manual control mechanisms (e.g., one or more rocker/rotary switches 228 and/or one or more knob-controlled potentiometers 228 via control bus 250 of FIG. 2), which may be located within the cab of a vehicle (e.g., vehicle 100 of FIG. 1). Current controllers 208 may be pre-configured (e.g., wirelessly or factory preset) such that if a single current controller 208 is activated via its associated trigger wire of control bus 250, then a percentage (e.g., 100%) of the available current may be conducted by the associated LED/Optic group 206 for maximum intensity. Generally, if more than one (N) current controller 208 is activated via its associated trigger wire of control bus 250, then a reduced percentage (e.g., 100%/N) of the available current may be conducted by the associated LED/Optic groups 206 for maximum shared intensity.

As per one example of a wireless re-configuration, each of menu selectors 1002-1006 may be selected by the user (e.g., via scroll bars 1008-1012, respectively) to configure each light fixture's operation when the associated "MANUAL" control for that light fixture is activated (e.g., as discussed above via button 982 of GUI 950A of FIG. 9D). In one embodiment, a first rocker/rotary switch and/or a control knob (e.g., local control 228 via control bus 254 of FIG. 2) may be hardwired to a "ROLL BAR" light fixture (e.g., light fixture 104 of FIG. 1), a second rocker/rotary switch and/or a control knob (e.g., local control 228 via control bus 254 of FIG. 2) may be hardwired to a "LEFT A PILLAR" light fixture (e.g., light fixture 106 of FIG. 1) and a third rocker/rotary switch and/or control knob (e.g., local control 228 via control bus 254 of FIG. 2) may be hardwired to a "RIGHT A PILLAR" light fixture (e.g., light fixture 108 of FIG. 1).

Menu selector 1002 may, for example, be allocated to control the operation of the "ROLL BAR" light fixture when the associated rocker/rotary switch is activated. As illustrated, by highlighting the "SPOT" selection in menu selector 1002, activation of the associated rocker/rotary switch causes the processor (e.g., microprocessor 210 of FIG. 2) to activate each light element (e.g., light elements 904-914 of FIG. 9) previously configured as spot lenses (e.g., as discussed above in relation to lighting system 900 of FIG. 9). In addition, scroll bar 1014 may be used to select an attribute (e.g., intensity magnitude) that may be produced by light elements (e.g., light elements configured with spot lenses) of the "ROLL BAR" light fixture upon its activation and thereafter. Intensity magnitude control may, for example, be communicated wirelessly (e.g., via interface 1014 through any one or more of an NFC, thread, WiFi or Bluetooth communication medium) to the processor (e.g., microprocessor 210 via interface 226 of FIG. 2) associated with the "ROLL BAR" light fixture. Alternately, intensity magnitude control may, for example, be manually communicated via a wired interface based, for example, on one or more knob-controlled potentiometers (e.g., local control 228 of FIG. 2) thereby controlling an output (e.g., one or more 0-10V controllers 242 of FIG. 2) to the one or more current control modules (e.g., current control modules 208 via control bus 244) associated with the "ROLL BAR" light fixture. Updates of such manually controlled intensity magnitude adjustments may be provided to the processor associated with the "ROLL BAR" light fixture and may then be communicated via an interface (e.g., interface 226 of FIG. 2 and interface 1014) so that remote control device 1000 may update intensity indicator 1032 in accordance with the manually controlled intensity magnitude.

Similarly, menu selectors 1004-1006 may, for example, be allocated to control the operation of the "LEFT A PILLAR" and "RIGHT A PILLAR" light fixtures, respectively, when their associated rocker switch is activated. As illustrated, by highlighting the "FLOOD" selection in menu selectors 1004 and 1006, activation of the associated rocker switch causes the processor (e.g., microprocessor 210 of FIG. 2) to activate each light element (e.g., light elements 918-924 and 928-934 of FIG. 9) previously configured as flood lenses (e.g., as discussed above in relation to lighting system 900 of FIG. 9). In addition, scroll bars 1016-1018 may be used to select an attribute (e.g., intensity magnitude) that may be produced by the "LEFT A PILLAR" and "RIGHT A PILLAR" light fixtures upon activation and thereafter. Intensity magnitude control may, for example, be communicated (e.g., via interface 1014 through any one or more of an NFC, thread, WiFi or Bluetooth communication medium) to the processor associated with the "LEFT A PILLAR" and "RIGHT A PILLAR" light fixtures. Alternately, intensity magnitude control may, for example, be manually communicated via a wired interface based, for example, on one or more knob-controlled potentiometers (e.g., local control 228 of FIG. 2) thereby controlling an output (e.g., one or more 0-10V controllers 242 of FIG. 2) to the one or more current control modules (e.g., current control modules 208) associated with the "LEFT A PILLAR" and "RIGHT A PILLAR" light fixtures. Updates of such manually controlled intensity magnitude adjustments may be provided to the processor associated with the "LEFT A PILLAR" and "RIGHT A PILLAR" light fixtures and may then be communicated via an interface (e.g., interface 226 of FIG. 2 and interface 1014) so that remote control device 1000 may update intensity indicators 1034 and 1036, respectively, in accordance with the manually controlled intensity magnitudes.

A power smoothing function may also be implemented for each light fixture (e.g., light fixtures 901, 903 and 905 of lighting system 900 of FIG. 9) when, for example, the requested intensity magnitude exceeds the capabilities of the associated light fixture. Such a power smoothing function may be activated via menu selectors 1020, 1022 and 1024 for each respective light bar (e.g., light fixtures 901, 903 and 905 of lighting system 900 of FIG. 9).

As per one example, a user may wish to highlight the "ALL" selection of menu selectors 1002-1006 thereby activating all light elements in each light fixture (e.g., light fixtures 901, 903 and 905 of FIG. 9) and may further choose to select an intensity magnitude setting for each light element of each light fixture via scroll bars 1014-1018, respectively. Such intensity magnitude settings may, however, exceed the maximum current magnitude (e.g., as controlled via current control modules 208 of FIG. 2) that may be generated by a single DC-DC converter (e.g., one of buck-boost converters 204 of FIG. 2). Such a scenario may be a possibility in the event that only a single buck-boost converter is being utilized to drive current into all light elements of the light fixture. In such an instance, the processor (e.g., microprocessor 210 of FIG. 2) may scale the intensity selection down to the maximum current magnitude achievable for each light element of each light fixture when the associated power smoothing selectors 1020, 1022 and/or 1024 are set to the "ON" selection.

As per another example, an "OFF-ROAD" or an "ON-ROAD" mode of operation may be selected via mode selector 982 whereby each processor (e.g., microprocessor 210 of FIG. 2) of each light fixture may receive operational input control via automotive sensors (e.g., headlight indicators 221 of FIG. 2). In such an instance, for example, the operation of each light fixture of FIG. 9 may be governed depending upon whether the headlights of the associated vehicle are activated or deactivated. If headlights are activated and mode selector 982 is set to "ON-ROAD", for example, then the processor (e.g., microprocessor 210 of FIG. 2) may activate each light element (e.g., light elements 904-14, 918-924 and 928-934 of FIG. 9) previously configured as either SAE Drive, SAE FOG or both. Conversely, if headlights are activated and mode selector 982 is set to "OFF-ROAD", for example, then the processor (e.g., microprocessor 210 of FIG. 2) may activate each light element (e.g., light elements 904-914, 918-924 and 928-934 of FIG. 9) previously configured as either SPOT, FLOOD or SPOT/FLOOD MIX.

A backlight/running light function (e.g., as discussed above in relation to light pipe 870 of FIG. 8B) may be selected via selectors 1026, 1028 and 1030 whereby such selections may be communicated via interface 1014 and received/implemented by the processor (e.g., microprocessor 210 via interface 226 of FIG. 2). In one embodiment, the backlight/running light function may utilize different colors of illumination, whereby the color of illumination may be selected by utilizing the power cycling control aspects as discussed in U.S. Pat. No. 9,648,686 entitled "LED device with power removal detection and method for using the same" issued on May 9, 2017, which is incorporated herein by reference in its entirety. Such power removal detection may, for example, be implemented through use of a switch (e.g., a rocker switch located on the inside of vehicle 100 of FIG. 1) to control the connection and disconnection of a vehicle power supply (e.g., via switch 246 of FIG. 2) which may apply and remove vehicle power from the light fixture (e.g., light fixture 200 of FIG. 2) as may be detected by the processor (e.g., microprocessor 210 via interface 226 of FIG. 2). In response, the processor may activate one or more different colored LEDs (e.g., LED/optic groups 206) sequentially with each power cycle.

In an alternate embodiment, a remote control device (e.g., a handheld magnet) may be used in proximity to a light fixture to wirelessly control functionality. Each light fixture may, for example, include a magnetic interface (e.g., wireless interface 226 of FIG. 2) that may be sensitive to a magnetic field generated by a user (e.g., via remote control device 224 of FIG. 2). The presence of the magnetic field may be detected (e.g., via wireless module 248 of FIG. 2), which may be utilized by a processor (e.g., microprocessor 210 of FIG. 2) to configure the operation of a light fixture upon the activation of one or more trigger wires and/or one more power wires that may be associated with one or more light fixtures by the user.

As per one example, activation of one or more trigger and/or power wires that may be associated with one or more light fixtures may place the associated one or more light fixtures into a configuration mode, whereby in response to a number of magnetic field variations (e.g., as implemented by the placement of a handheld magnetic device into and out of proximity of magnetic interface 226 of FIG. 2) during configuration mode, a processor (e.g., microprocessor 210 of FIG. 2) may toggle through a list of configuration entries contained within a look-up table (e.g., a look-up table that may be contained within memory 238 of FIG. 2). Once the final magnetic field variation is detected, the then current configuration activated within the look-up table may become the programmed configuration associated with the active trigger wire and/or active power wire. It should be noted that the processor may either automatically continue to toggle through each entry of the look-up table so long as the magnetic field is present or conversely may require a complete cycle (e.g., detected presence followed by a detected absence) of the magnetic field to sequentially toggle through each entry of the look-up table one at a time.

In one embodiment, a first rocker/rotary switch and/or a control knob and/or a keypad (e.g., as implemented by local control 228 via control bus 254 of FIG. 2) may be hardwired to provide one or more trigger wires (e.g., N=3 trigger wires) to a processor (e.g., microprocessor 210 of FIG. 2). Each of the N trigger wires may be configured to effectuate exemplary operation of each respective light fixture (e.g., via control bus 260 of FIG. 2) in accordance with Table 2.

TABLE 2

| SPOT (%) | DRIVE (%) | FLOOD (%) |
|---|---|---|
| 100 | 0 | 0 |
| 80 | 20 | 0 |
| 50 | 50 | 0 |
| 20 | 80 | 0 |
| 0 | 100 | 0 |
| 0 | 80 | 20 |
| 0 | 50 | 50 |
| 0 | 20 | 80 |
| 0 | 0 | 100 |

As per one example, activation of a single trigger wire (e.g., via local control 228 of FIG. 2) may place the one or more light fixtures into a configuration mode, whereby the intensity of the associated light distribution may be configured in accordance with a table column (e.g., the first or third column of Table 2). In response to each detected magnetic field variation, a processor (e.g., microprocessor 210 of FIG. 2) may sequentially activate the intensity (e.g., the SPOT or FLOOD intensities as defined by each row of the first or third columns, respectively, of Table 2) by appropriate current control (e.g., via control bus 260 using current control modules 208 of FIG. 2). Once the activated intensity produced by each associated light fixture conforms to the user's desired intensity, the user may discontinue the use of magnetic field variations to exit configuration mode (e.g., via a timer feature implemented by processor 210 to detect the absence of magnetic field variations over a threshold amount of time). Once the single trigger wire is configured, subsequent activations of the single trigger wire may then be used to effectuate the desired intensity of the desired distribution (e.g., 80% SPOT distribution intensity or 50% FLOOD distribution intensity).

As per another example, simultaneous activation of more than one trigger wire (e.g., two trigger wires via local control 228 of FIG. 2) may place the one or more light fixtures into a configuration mode, whereby the intensity of multiple associated light distributions may be configured in accordance with multiple table columns (e.g., the first and second columns of Table 2). In response to each detected magnetic field variation, a processor (e.g., microprocessor 210 of FIG.

2) may sequentially activate two or more intensities (e.g., the SPOT and DRIVE intensities as defined by each row of the first and second columns, respectively, of Table 2). Once the activated intensities produced by each associated light fixture conform to the user's desired intensities, the user may discontinue the use of magnetic field variations to exit configuration mode. Once the multiple trigger wires are configured, subsequent simultaneous activations of the multiple trigger wires may then be used to effectuate the desired intensities of the desired distributions (e.g., 20% SPOT distribution intensity and 80% DRIVE distribution intensity simultaneously).

As per yet another example, activation of a single trigger wire (e.g., via local control 228 of FIG. 2) may place the one or more light fixtures into a configuration mode to allow a secondary effect (e.g., backlight color) to be configured as defined in Table 3.

TABLE 3

Red
Green
Blue
Light Blue
Purple
Amber
Warm White
Cool White
Color Rotation
Animation1
Animation2
Animation3
Animation4
Animation5

In response to each detected magnetic field variation, a processor (e.g., microprocessor 210 of FIG. 2) may sequentially activate the color (e.g., the colors as defined by the top eight rows of Table 3) or the special effects (e.g., the special effects as defined by the bottom six rows of Table 3). Once the activated color or special effect produced by each associated light fixture conforms to the user's desires, the user may discontinue the use of magnetic field variations to exit configuration mode. Once the single trigger wire is configured, subsequent activations of the single trigger wire may then be used to effectuate the desired backlight color or special effect.

It should be noted that pre-configuration of the trigger wires need not be implemented via remote control device 224 of FIG. 2 as discussed above. Instead, each light fixture may include a physical input/output (I/O) device (e.g., a push button or capacitive sensing device) with which the user may cause traversal of the light distribution intensities, colors and/or special effects of Tables 2 and 3. In operation, the user may actuate the physical I/O device and in response, the light fixture may enter a configuration mode whereby a processor (e.g., microprocessor 210 of FIG. 2) may sequentially activate the light distribution intensities, colors and/or special effects of Tables 2 and 3 until the user is satisfied. Once the one or more trigger wires are configured, subsequent activations of the one or more trigger wires may then be used to effectuate the desired light distribution intensity, backlight color and/or special effect.

Figure 11:
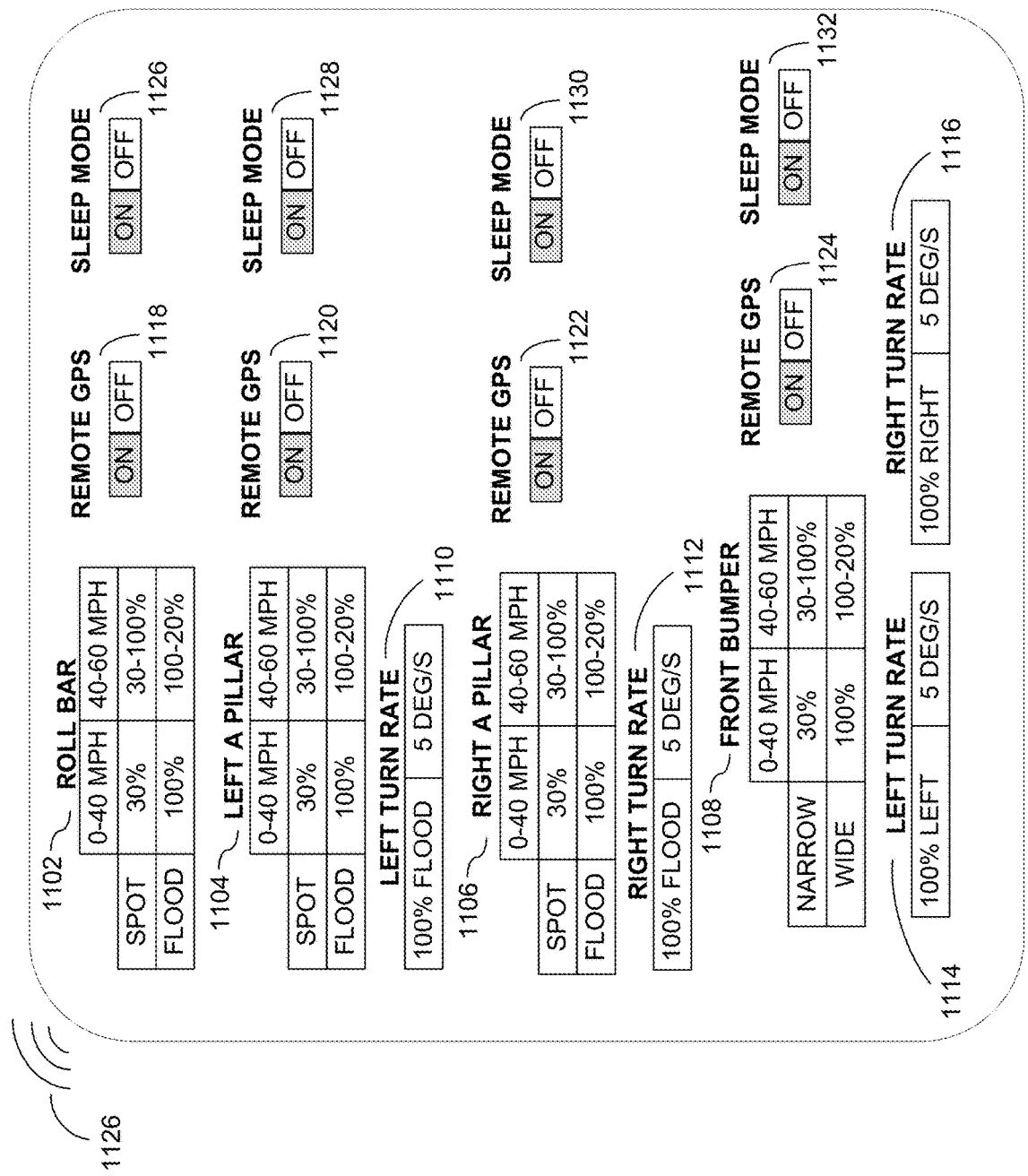
FIG. 11 illustrates a graphical user interface of a remote control device in accordance with an alternate embodiment of the present invention.
Figure 13B:
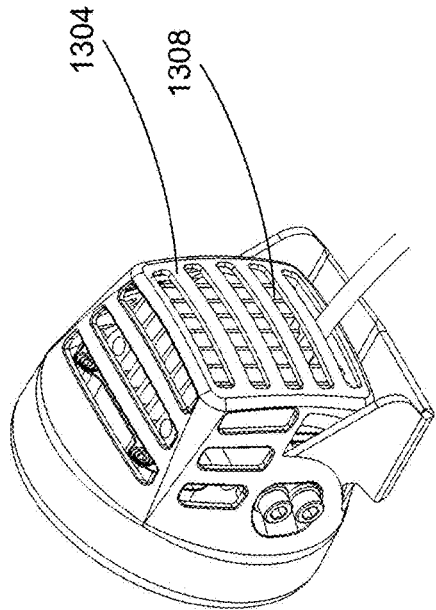
FIGS. 13A-13D illustrate an adaptable vehicle light in accordance with alternate embodiments of the present invention.
Figure 13D:
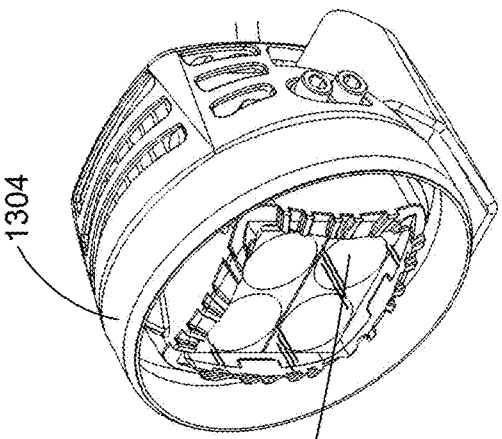
Figure 13A:
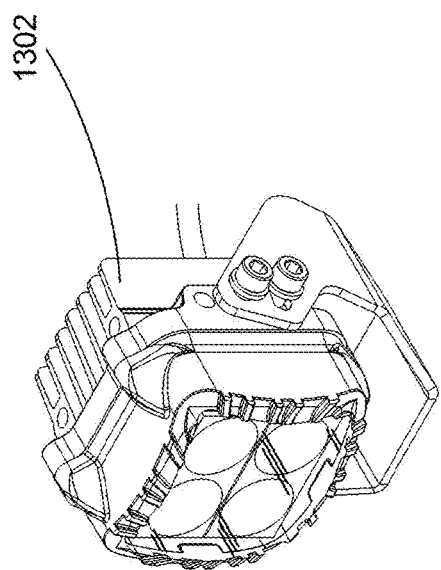
Figure 13C:
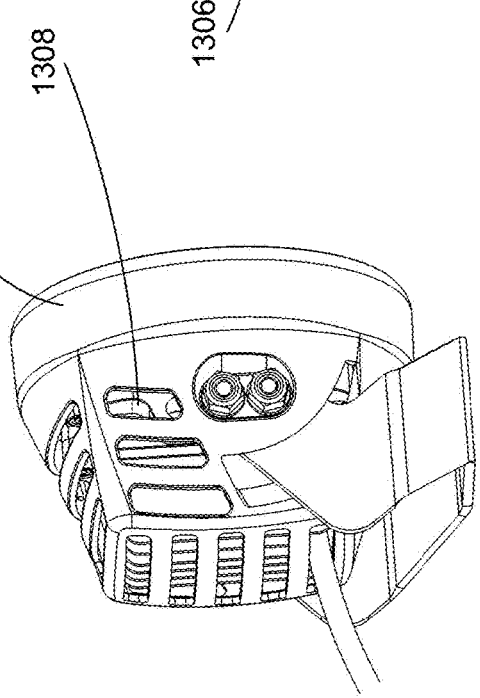

Turning to FIG. 11, GUI 1100 is exemplified, which may be activated on a remote control device (e.g., a user's smartphone, tablet, laptop, watch, etc.) when an adaptive mode is activated (e.g., button 982 of FIG. 9D is selected to "ADAPTIVE") as discussed above in relation to FIG. 9D. In such an instance, a user may configure the various light fixtures (e.g., light fixtures 901, 903 and 905 of FIG. 9, light fixture 300 of FIG. 3 and/or light fixture 500 of FIG. 5) that may be provisioned on a particular vehicle (e.g., vehicle 100 of FIG. 1) for operation in an adaptive mode where certain light characteristics are configured based upon measured dynamic attributes of a vehicle upon which the light fixtures may be mounted. If the remote control device includes a GPS, then selectors 1118-1124 may be configured to allow the GPS settings to be measured by the user's remote control device and communicated to each light fixture via interface 1126 (e.g., via interface 226 of FIG. 2). Conversely, such a mode may be turned off, such that GPS measurements may be derived locally within each light fixture (e.g., via sensor 216 of FIG. 2).

Light fixtures 300, 500 and those identified by selectors 1102, 1104 and 1106 may, for example, be identified and provisioned as discussed above in relation to FIG. 9, whereby the LIGHT ID, LOCATION ID and LENS ID for each light fixture as well as the adaptive settings as exemplified by GUI 1100 may be configurable, whereby the configuration may be locally stored within a memory of each light fixture (e.g., within memory 238 of FIG. 2). In addition, the configuration settings as exemplified by FIGS. 9-11 may be shared across multiple remote control devices via a configuration data exchange done wirelessly between one or more remote control devices (e.g., via interfaces 980, 1014 and/or 1126 through any one or more of an NFC, thread, WiFi or Bluetooth communication medium).

As exemplified by selectors 1102, 1104, 1106 and 1108, adaptive settings may be configured for each light fixture based on certain dynamic attributes that may be associated with the vehicle upon which each light fixture may be mounted. In one embodiment, for example, those light elements in each light fixture configured with spot (or narrow) lenses may be operated at, for example, a percentage (e.g., 30%) when the velocity of the vehicle is between a velocity range (e.g., between 0-40 mph) and increased linearly between a percentage range (e.g., 30-100%) when the corresponding velocity increases linearly between a velocity range (e.g., 40-60 mph). Similarly, for example, those light elements in each light fixture configured with flood (or wide) lenses may be operated at, for example, a percentage (e.g., 100%) when the velocity of the vehicle is between a velocity range (e.g., 0-40 mph) and decreased linearly between a percentage range (e.g., 100-20%) when the corresponding velocity increases linearly between a velocity range (e.g., 40-60 mph).

In addition, turning attributes of the vehicle may be sensed which may further modify the light distribution of one or more light fixtures provisioned within the light system. As per an example, a left turn rate of the vehicle may be measured and in conformance with the configuration settings of selectors 1110 and 1114, the light fixtures provisioned on the left side of the vehicle (e.g., on the left A pillar and the left bumper) may produce an intensity (e.g., 100% intensity) from light elements configured with a flood (or wide) lens. Similarly, a right turn rate of the vehicle may be measured and in conformance with the configuration settings of selectors 1112 and 1116, the light fixtures provisioned on the right side of the vehicle (e.g., on the right A pillar and the right bumper) may produce an intensity (e.g., 100% intensity) from light elements configured with a flood (or wide) lens.

Still further, certain attributes of the vehicle may determine whether a sleep mode (e.g., via selectors 1126-1132) may be activated. If configured for sleep mode, a processor (e.g., processor 210 of FIG. 2) may determine whether the vehicle is operable (e.g., whether the vehicle's ignition system is activated or whether the vehicle's power supply 202 is available for use). If the vehicle is not operable, for example, processor 210 may disable all controls (e.g., current control modules 208) that may be associated with each associated light fixture configured for sleep mode to reduce the power consumed by each light fixture to a very low level (e.g., zero amp current draw) so as to preclude depletion of the power available from power supply 202 and/or battery 232.

Turning to FIG. 12, light fixtures provisioned for use by each of vehicles 1202-1212 as discussed herein may be operating in a group mode of operation (e.g., as activated via button 982 of FIG. 9D when selected to "Group") to provide full-perimeter adaptive lighting on demand. While in group mode, for example, each provisioned light fixture of each vehicle 1202-1212 may each comprise a node within a network of nodes that may be operating via wireless network 1208 (e.g., a Bluetooth, WiFi, NFC or thread-based mesh wireless network) that may be established between a remote control device (e.g., remote control 224 of FIG. 2) and each respective light fixture (e.g., via wireless interface 226 and wireless module 248 of FIG. 2).

In one embodiment, a single operator of any vehicle may establish a group mode of operation whereby each light fixture of each vehicle operating within network 1208 may be synchronized to the corresponding light fixture of each other vehicle operating in network 1208. As per one example, the operator establishing group mode may act as the master controller within wireless network 1208, whereby lighting controls associated with the operator's remote control device (e.g., as discussed above in relation to FIGS. 9, 10 and 11) may be synchronized across all slave light fixtures operating within the group. Upon establishment of group mode, a processor (e.g., microprocessor 210 of FIG. 2) of each slave light fixture of the remaining vehicles may override manual selectability and may instead implement lighting controls in conformance with lighting commands received within wireless network 1208 from the master controller.

Turning back to FIG. 2, for example, processor 210 of each slave light fixture may implement such lighting commands received via remote control 224 by utilizing local control 228 to modulate 0-10V controller 242 with discrete data that may be indicative of such lighting commands. Accordingly, binary data that may be represented by voltage extremities presented on control bus 244 (e.g., binary voltage extremities operating at a predetermined baud rate between 0 volts and approximately 10-12 volts) may be received by current controllers 208, which may then be used to control each LED/optic group 206 as discussed herein in accordance with the received binary data. As such, control bus 244 may be used as a digital control bus (e.g., whereby data is transmitted discretely as either a logic "1" or a logic "0") at a particular baud rate during a particular mode of operation (e.g., group mode), but may instead operate as an analog control bus (e.g., whereby data is relayed as an analog control voltage magnitude anywhere between about 0 and 10 volts) during any other mode of operation (e.g., group mode or any other mode of operation).

In alternate embodiments, a combination of control may be utilized. As discussed above, for example, trigger wires may be utilized to manually activate any one or more light configurations within any one light fixture or across any two or more light fixtures. For example, if a trigger wire from local control bus 250 of FIG. 2 is activating "SPOT" and "FLOOD" configurations of light fixtures 106 and 108 of FIG. 1 and control bus 244 does not indicate any further control information (e.g., either the 0-10V control is maintained at a deactivated control voltage of 12 volts or is devoid of digital control information), then the "SPOT" and "FLOOD" configurations of light fixtures 106 and 108 may share equally the total power available to light fixtures 106 and 108. Conversely, for example, if a trigger wire from local control bus 250 of FIG. 2 is activating "SPOT" and "FLOOD" configurations of light fixtures 106 and 108 of FIG. 1 and control bus 244 indicates further control information (e.g., either the 0-10V control indicates a control voltage between 0-10 volts or is modulated by digital control information), then the "SPOT" and "FLOOD" configurations of light fixtures 106 and 108 may split the total power available to light fixtures 106 and 108 in accordance with such control information (e.g., the "SPOT" and "FLOOD" configurations may operate at 25% of the available power when the control voltage is held at 2.5 volts or if the digital control information modulates the control voltage with digital control information indicating a 25% intensity level).

Turning back to FIG. 12, various tactical scenarios may be envisioned for a convoy of military vehicles or urban crowd control vehicles (e.g., vehicles 1202-1212) whose light fixtures may be operating in group mode within network 1208 to provide full perimeter, on demand lighting. As per one example, vehicles 1202-1212 may constitute a military convoy traveling at night through hostile territory, whereby a diversion may cause the convoy to stop. Pertinent light fixtures (e.g., forward facing light fixtures of vehicles 1202-1206 and rear facing light fixtures of vehicles 1208-1212) provisioned within the vehicles of the convoy may then be commanded in group mode to initiate full power lighting along with a long distance beam (e.g., a spot beam) to promote situational awareness beyond night vision device (NVD) usefulness (e.g., between about 200-400 feet) and without the associated tunnel vision. As such, conventional night vision technology may be used for target acquisition while the instant-on adaptive lighting may be used to illuminate, disorient and engage the target suspects of interest.

As per an alternate example, vehicles 1202-1212 may constitute a military convoy traveling at night engaging hostile contacts, whereby any operator in any vehicle may command the network of light fixtures in the relevant convoy (e.g., forward facing light fixtures of vehicles 1202-1206) to full power flood or spot light instantly. Conventional NVD systems may allow for automatic exposure gating to maintain the visibility and engagement of the hostile contacts while concealing the convoy of friendly soldiers that may be hidden behind the curtain of tactical flood light produced. Hostile fire may, for example, be directed at the perimeter of tactical lighting, thereby drawing the hostile fire away from the convoy of friendly soldiers while they engage the enemy from a safe distance behind the excessive perimeter lighting. Furthermore, wireless network 1208 may allow the vehicles to be vacated while group control of the associated lighting is nevertheless maintained.

Group mode may also include adaptive group lighting based on the dynamics of the military convoy's movements. As per one example, lighting produced toward the front and back of each vehicle may transition between flood and spot distributions depending upon the speed of the convoy and the relative location of the vehicle within the convoy. Vehicles that are not located at the front of the convoy (e.g., vehicles 1208-1212) may be assigned functionality to maintain dimmed fore lighting and maximized aft lighting while maintaining side lighting at increased intensity during movement while vehicles that are located at the front of the convoy (e.g., vehicles 1202-1206) may be assigned functionality to maintain dimmed aft lighting and maximized fore lighting while maintaining side lighting at increased intensity during movement.

Group mode may also include adaptive group lighting based on the dynamics of the atmosphere within which the military convoy may be operating. As per one example, all light fixtures within the group may include multiple colors (e.g., white, IR and amber) of lighting. IR may be selected, for example, when the convoy operates at night, but may quickly and immediately switch all light fixtures over to visible light (e.g., white or amber) upon demand. Amber may be used, for example, for obscured visibility (e.g., during fog or sand/dust conditions), which may be detected by an optical sensor (e.g., camera 221 of FIG. 2).

In one embodiment, an optical sensor (e.g., photo diode 220 of FIG. 2) may be used to detect the amount of light being reflected back to the light fixture by the atmosphere (e.g., fog, dust or sand). In response, either manually or automatically, a less reflective color of light may be selected (e.g., changed from white to amber) for distribution by the light fixture. In addition, by allowing for both a white and amber light distribution, a color temperature may be selected that may be warmer than the color temperature of a native white by itself.

In alternate embodiments, group mode may include a group of light fixtures that do not incorporate many of the control features as discussed above in relation to FIG. 2. For example, each light fixture may not include a processor 210 or any of sensors 212-222 and 234. Instead, such devices may be included in a single control device (e.g., control device 258 of FIG. 2), such that the control device may issue commands to each light fixture (e.g., via one or more wired interfaces) that may be based upon automated or manual control inputs. Such a wired interface may exhibit such characteristics as discussed above in relation to control busses 244, 250 and 254.

Control device 258 may be interconnected within a vehicle (e.g., vehicle 100 of FIG. 1) via a controller area network (CAN) bus. As a result, the control device may be seamlessly integrated within original equipment manufacturers' (OEM) control systems and interconnected (e.g., via CAN bus 256 of FIG. 2) to allow the OEM control systems to interact with control device 258 to effectuate the controls as discussed herein. Still further, control device 258 may include a wireless interface (e.g., as discussed above in relation to wireless interface 226 of FIG. 2) including, for example, a Bluetooth, WiFi, NFC, and/or a thread-based mesh interface to allow, for example, configuration as discussed above in relation to FIGS. 9A-9D and 10-11 or a magnetic interface to allow configurations as discussed above in relation to Tables 2 and 3. Further still, control device 258 may include a wired interface whereby a control panel (e.g., a touch screen interface of a CAN-bus control system) may be used to effectuate the configuration controls discussed herein.

Turning to FIGS. 13A-13D, vehicle lights are exemplified that may include a heat sink 1302 that may be shrouded by protective cover 1304. As illustrated, protective cover may be arranged to preclude access to heat sink 1302 (e.g., egress vents sized small enough to prevent a human finger from gaining access to heat sink 1302) thereby substantially preventing risk of injury due to heat. As such, LEDs 1306 may be allowed to generate more heat onto heat sink 1302, since heat sink 1302 may be allowed to operate at a higher temperature than would otherwise be prudent in the absence of protective cover 1304.

In one embodiment, protective cover 1304 may be constructed from a thermally non-conductive material (e.g., high temperature plastic) with ventilation egress ports 1308 to allow convected heat that may be developed on heat sink 1302 to escape into the atmosphere. It should be noted that protective cover 1304 may be constructed in any shape or size to allow shrouding of virtually any vehicle light. In addition, protective cover 1304 may be fashioned to fit within open cavities of a vehicle that may, for example, be meant for OEM fog light applications.

The presence of protective cover 1304 may be conducive to certain design changes to be made relating to heat sink 1302. As per one example, instead of overly complicated and typically heavy die cast materials used in the production of heat sinks intended for use in the absence of protective cover 1304, lower cost and lighter weight extrusions may be used since they may be allowed to operate at a higher temperature.

Protective cover 1304 may also include features (not shown) that may allow a mechanical linkage of two or more vehicle lights. The mechanical linkage may provide a means to maintain a fixed, mechanical relationship between each linked vehicle light, such that each light may be allowed to swivel along an axis (e.g., a vertical axis or a horizontal axis) of the vehicle light while maintaining separation of each vehicle light in a direction perpendicular to the swivel axis (e.g., along a horizontal axis or vertical axis, respectively).

In one embodiment, the mechanical linkage may allow the entire light and protective cover to be rotated or swiveled in order to aim the light in user configurable directions. In alternate embodiments, the mechanical linkage may be arranged such that the light rotates or swivels inside of the protective cover, while the protective cover remains substantially stationary.

Figure 14A:
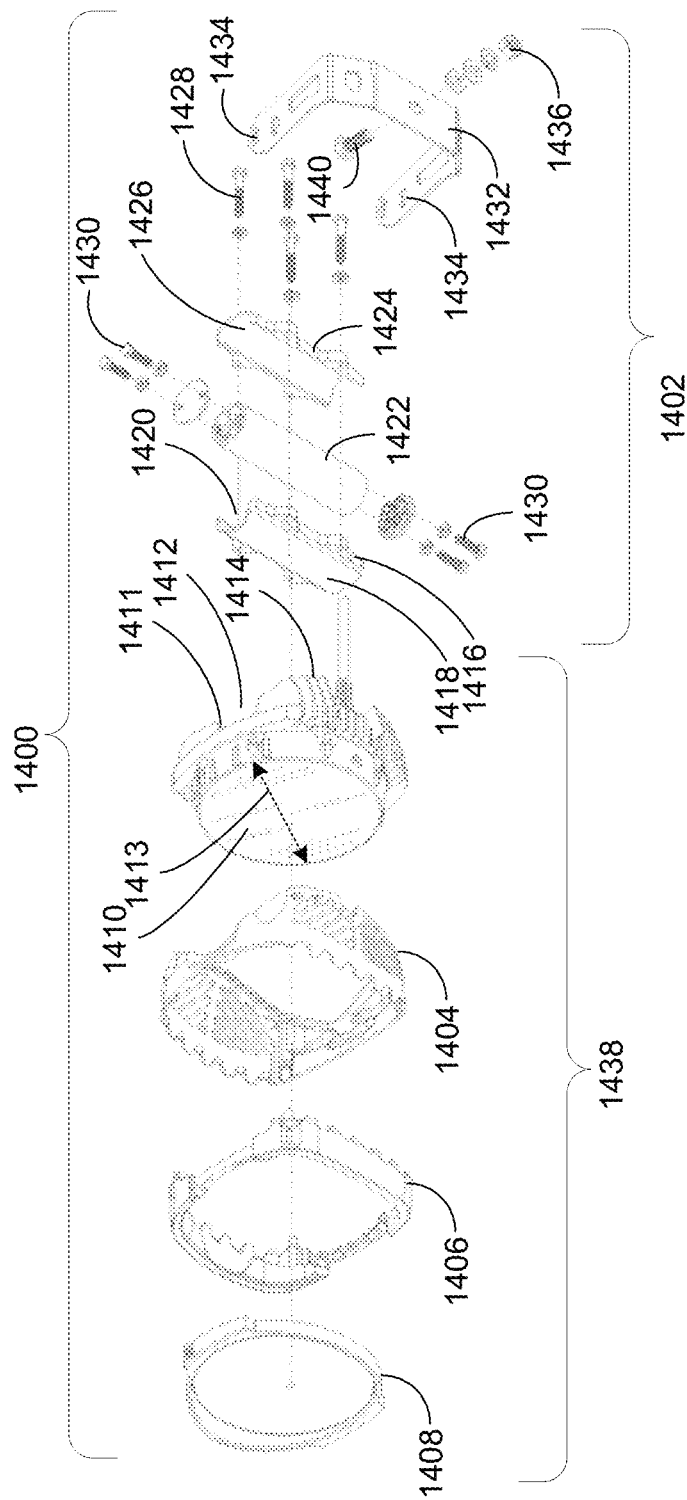
FIGS. 14A-14B illustrate exploded views of a vehicle light having a mount in accordance with an alternate embodiment of the invention.
Figure 14B:
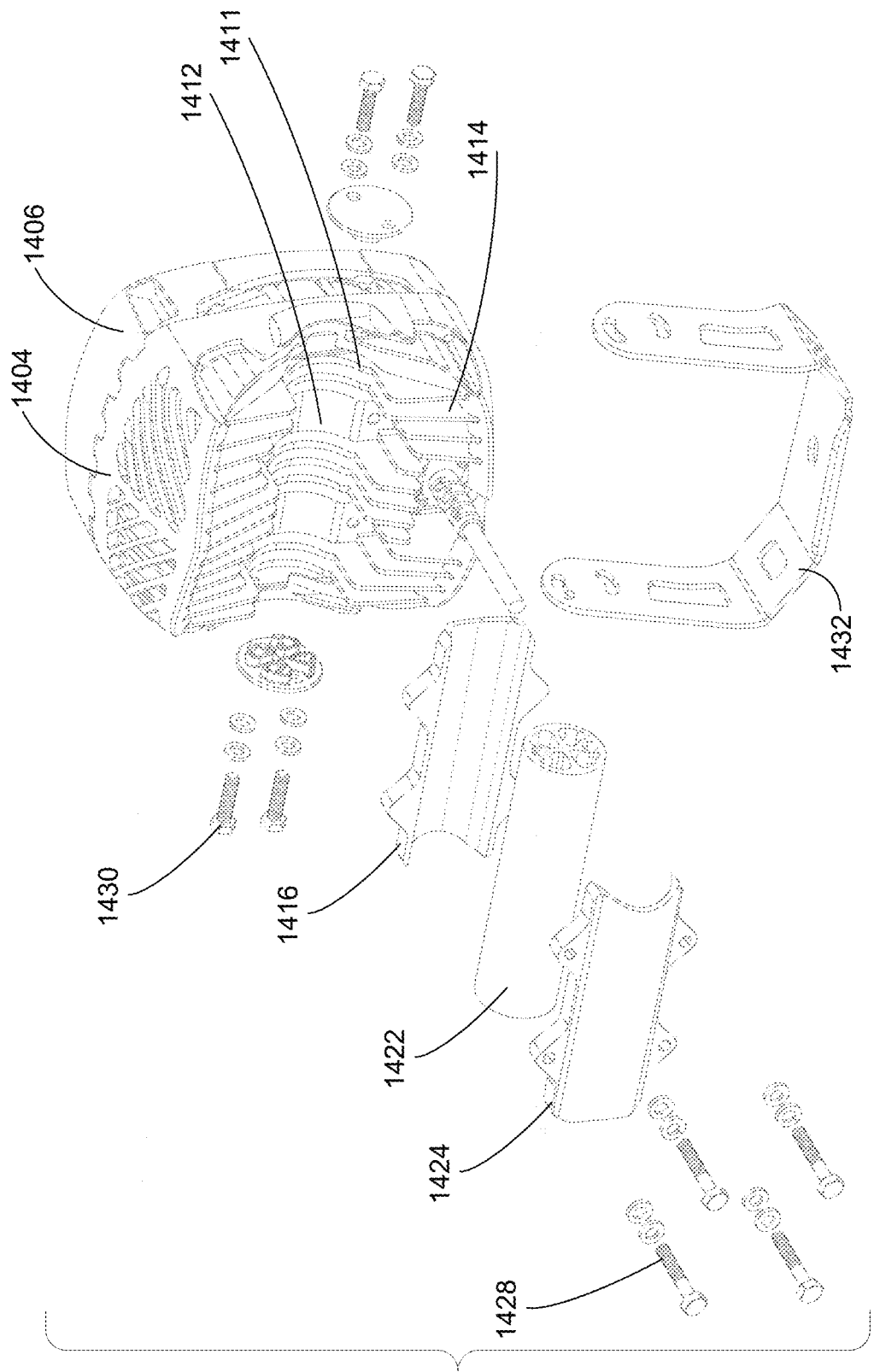

Turning to FIGS. 14A and 14B, exploded views 1400 and 1450, respectively, of an alternate embodiment of a vehicle light is exemplified in which optional mounting components 1402 are illustrated for use (e.g., as may be required to mount vehicle light 1438 to a vehicle not shown). Protective cover 1404 may be used to protect portions of light 1438 from being accessed by human hands (e.g., as discussed above in relation to FIGS. 13A-13D) to avoid injury caused by physical contact with excessively hot components. Further, components 1406 and 1408 may form a removable bezel that may be "snapped" into place thereby allowing removable lens 1410 to be secured. In one embodiment, for example, different colored lenses 1410 may be interchanged within vehicle light 1438 depending upon a color of light (e.g., amber) that may be sought to be emitted by vehicle light 1438, or conversely, as may be needed to swap lenses required for both off-road (e.g., spot or flood) and on-road (e.g., SAE Fog or SAE Drive) use (e.g., as discussed above in relation to lens 860 of FIG. 8).

Heat sink fin array 1414 may be used to provide a thermally conductive path with which heat may be extracted away from vehicle light 1438. Heat sink fin array 1414 may further facilitate mounting of vehicle light 1438 to a vehicle (not shown) with one or more optional mounting components 1402. Individual recesses 1411 may, for example, exist within each fin of heat sink fin array 1414 representing a void, or absence, of material. Once recess 1411 of each fin of heat sink fin array 1414 is aligned, recess 1412 may be formed to extend across a backside of vehicle light 1438 along lateral axis 1413 running perpendicular to an optical axis of vehicle light 1438 through a portion (e.g., middle portion) of heat sink fin array 1414 as shown.

In one embodiment, recess 1412 may form a geometrically shaped (e.g., cylindrically shaped) void having an inner radius that may be configured to accommodate one or more mounting components 1402 within an interior of vehicle light 1438 (e.g., as more clearly shown in FIG. 14B). As such, recess 1412 may be integrated within vehicle light 1438 to facilitate a shallower mounting profile thereby minimizing the separation distance between vehicle light 1438 and its respective vehicle mount location. In other embodiments, recess 1412 may exhibit any one of a number of other geometrical configurations (e.g., rectangular, square, L-shaped, T-shaped, etc.) whereby the shape of one or more mounting components 1402 may be matched to the geometrical configuration of recess 1412.

As per one example, an inner radius of recess 1412 may be configured to be substantially equal to outer radius 1418 of clamp section 1416, such that once clamp section 1416 is mounted to heat sink 1414 along recess 1412, recess 1412 may encapsulate clamp section 1416 within an interior of heat sink fin array 1414 such that each fin of heat sink fin array 1414 may be in thermal communication with a perimeter defined by outer radius 1418 of clamp section 1416. As such, clamp section 1416 (as well as other optional mounting components 1402) may become a part of the conductive path that may be used to conduct heat away from vehicle light 1438. In other embodiments, clamp section 1416 (as well as other optional mounting components 1402) may not form a part of the conductive path used to conduct heat away from vehicle light 1438.

As per another example, outer radius 1418 of clamp section 1416 may substantially match an inner radius of recess 1412, while inner radius 1420 of clamp section 1416 may be simultaneously configured with a comparatively different (e.g., smaller) radius. As such, clamp section 1416 may be used as a radius conversion device (e.g., reducer) that may be used to match, for example, a different (e.g., larger) radius that may be exhibited by recess 1412 to a comparatively different (e.g., smaller) radius that may be exhibited by tube 1422. Clamp section 1424 may further include inner radius 1426 that may be substantially matched to a radius of tube 1422 such that once mounted via hardware 1428, may secure clamp sections 1416/1424 and tube 1422 to recess 1412 regardless of the magnitude of the radius of tube 1422 as compared to the radius of recess 1412. In one embodiment, for example, a radius between about 1-2 inches (e.g., approximately 1.75 inches) formed by cylindrical recess 1412 may be matched to outer radius 1418 of clamp section 1416 while an inner radius 1420 of clamp section 1416 may be equal to or less than the radius of recess 1412. In one embodiment, for example, inner radius 1420 of clamp section 1416 may be reduced from about 1.75 inches to between about 1.75 and 1 inches (e.g., about 1.5 inches). As such, tube 1422 and corresponding clamp section 1424 each having a radius less than that of recess 1412 may nevertheless be accommodated by the radius reducing feature of clamp section 1416.

Once assembled, vehicle light 1438 may be mounted to bracket 1432 using hardware 1430 and corresponding slots 1434. In one embodiment, for example, slots 1434 may be elongated and curved such that vehicle light 1438 may be rotated slightly in opposing directions (e.g., up and down) while vehicle light 1438 remains adjustably mounted to the vehicle (not shown) via bracket 1432 and associated mounting hardware 1440 and 1436. Thus, a light beam generated by vehicle light 1438 may be adjusted through operation of slots 1434 and hardware 1430 despite the absence of accessibility to any of the other mounting components 1402.

In some embodiments, tube 1422 (and associated bracket 1432) may exhibit a length that may be different (e.g., longer) than a length of clamp sections 1416 and 1424. As such, virtually any number of vehicle lights 1438 may be mounted to a single tube 1422 thereby providing a cluster of vehicle lights 1438 that may be configured along a longitudinal axis of tube 1422. Further, each vehicle light 1438 may be mounted to tube 1422 and may exhibit any one of a number of orientations (e.g., a forward-facing or backward-facing orientation) pointing between 0 and 360 degrees axially away from the longitudinal axis of tube 1422.

Still further, tube 1422 may be constructed to exhibit a shape that is not linear (e.g., slightly curved) so that multiple sub-clusters of vehicle lights 1438 (e.g., 1-2 vehicle lights 1438 per sub-cluster) may be mounted to tube 1422 whereby each sub-cluster of vehicle lights 1428 may generate a light distribution having an optical axis slightly offset from each neighboring sub-cluster of vehicles lights 1438. As per one example, each sub-cluster of vehicle lights 1438 may include a single vehicle light 1438 that may produce a 6-degree spot beam and due to the non-linear configuration of tube 1422 (e.g., 6-degree bends located between each straight section of tube 1422 where each vehicle light 1438 is mounted), each vehicle light 1438 may be mounted to produce a light distribution having an optical axis with a 6-degree offset as compared to neighboring vehicle light sub-clusters. As such, each 6-degree light distribution of each vehicle light 1438 may be optimally overlapped and blended through the use of the 6-degree mechanical offset provided by tube 1422. In other embodiments, the non-linear configuration of tube 1422 may facilitate non-overlapping light distributions of each sub-cluster of vehicle lights 1438.

Heat sink fin array 1414 may, for example, be composed of a material (e.g., a metal) so as to maximize heat-conducting capacity. Similarly, clamp sections 1416/1424 and tube 1422 may also be composed of heat conductive material (and optionally including heat sink fins not shown as well) such that clamp sections 1416/1424 and tube 1422 become an integral part of heat sink fin array 1414 to further extract heat away from vehicle light 1438. Conversely, clamp section 1416 may be omitted such that tube 1422 may be placed into direct contact with each fin of heat sink fin array 1414 once clamp section 1424 is used to mount vehicle light 1438 to tube 1422.

Other aspects and embodiments of the present invention will be apparent to those skilled in the art from consideration of the specification and practice of the invention disclosed herein. For example, clamp sections 1416 and 1424 along with tube 1422 may be removed altogether and instead incorporated into bracket 1432. It is intended, therefore, that the specification and illustrated embodiments be considered as examples only, with a true scope and spirit of the invention being indicated by the following claims.

What is claimed is:

1. A vehicle light mounted to a vehicle, comprising:
    a heat sink array having a recess disposed along a first axis within an interior of the vehicle light, the recess having a first radius;
    a first clamp section disposed within the recess, the first clamp section having a second radius;
    a tube disposed within the first clamp section, the tube having a third radius; and
    a second clamp section coupled to the first clamp section and the tube, the second clamp section having a fourth radius.

2. The vehicle light of claim 1, wherein the first, second, third and fourth radius are the same.

3. The vehicle light of claim 1, wherein the first and second radius are larger than the third and fourth radius.

4. The vehicle light of claim 1, wherein the first axis is perpendicular to an optical axis of light generated by the vehicle light.

5. The vehicle light of claim 4, further comprising a bracket coupled to the tube, wherein the bracket facilitates a variation in the optical axis while the vehicle light is mounted to the vehicle.

6. A lighting system, comprising:
   a vehicle; and
   one or more vehicle lights mounted to the vehicle, each of the one or more vehicle lights including,
      a heat sink array having a recess disposed along a first length of a first axis of the vehicle light, the recess being disposed within an interior of the heat sink array;
      a first clamp section disposed within the interior of the recess; and
      a second clamp section coupled to the first clamp section.

7. The lighting system of claim 6, further comprising a tube coupled between the first and second clamp sections.

8. The lighting system of claim 7, wherein a length of the tube is relatively equal to the first length.

9. The lighting system of claim 7, wherein a length of the tube is relatively longer than the first length.

10. The lighting system of claim 9, wherein the tube is substantially linear.

11. The lighting system of claim 10, wherein a plurality of vehicle lights are coupled to the tube.

12. The lighting system of claim 11, wherein the plurality of vehicle lights are disposed along a longitudinal axis of the tube, the longitudinal axis being parallel to the first axis.

13. The lighting system of claim 9, wherein the tube comprises a plurality of linear portions, each linear portion exhibiting an angular offset from each neighboring linear portion.

14. The lighting system of claim 13, wherein each of the plurality of vehicle lights is coupled to the tube at each of the corresponding plurality of linear portions.

15. A method of mounting at least one light to a vehicle, comprising:
   disposing a recess within a heat sink fin array of the at least one light, the recess extending along a first axis perpendicular to an optical axis of the at least one light;
   disposing a mount component within an interior defined by the recess; and
   mounting the at least one light to the vehicle via the mount component, wherein the optical axis of the at least one light may be adjusted while the at least one light is mounted.

16. The method of claim 15, wherein the mount component exhibits a geometrical shape substantially equal to a geometrical shape of the recess.

17. The method of claim 16, wherein the mount component and heat sink are configured to draw heat away from the at least one light.

18. The method of claim 15, wherein the mount component exceeds a length of the first axis.

19. The method of claim 18, wherein a plurality of lights are mounted to the vehicle via the mount component.

20. The method of claim 19, wherein the optical axis of each of the plurality of lights is set to extends axially away from the first axis between a range of 0 and 360 degrees.

* * * * *